(12) United States Patent
Mitchell

(10) Patent No.: US 11,783,027 B2
(45) Date of Patent: *Oct. 10, 2023

(54) SYSTEMS AND METHODS FOR MANAGING STATE

(71) Applicant: Intertrust Technologies Corporation, Sunnyvale, CA (US)

(72) Inventor: Stephen G. Mitchell, Ben Lomond, CA (US)

(73) Assignee: Intertrust Technologies Corporation, Milpitas, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/540,220

(22) Filed: Dec. 1, 2021

(65) Prior Publication Data

US 2022/0092175 A1 Mar. 24, 2022

Related U.S. Application Data

(63) Continuation of application No. 16/942,404, filed on Jul. 29, 2020, now Pat. No. 11,232,195.

(Continued)

(51) Int. Cl.
*G06F 21/54* (2013.01)
*H04L 9/32* (2006.01)

(52) U.S. Cl.
CPC ............ *G06F 21/54* (2013.01); *H04L 9/3242* (2013.01); *H04L 9/3263* (2013.01); *G06F 2221/2107* (2013.01)

(58) Field of Classification Search
CPC ...... G06F 21/54; G06F 21/123; G06F 21/125; G06F 21/14; G06F 21/51–52;

(Continued)

(56) References Cited

U.S. PATENT DOCUMENTS 6,532,451 B1 3/2003 Schell et al.
7,328,453 B2 2/2008 Merkle, Jr. et al.
(Continued)

FOREIGN PATENT DOCUMENTS

EP 2095288 1/2019

OTHER PUBLICATIONS

Collberg et al. Surreptitious Software: Obfuscation, Watermarking and Tamperproofing for Software Protection. Pearson Education Inc., Published 2010. (996 pgs).

(Continued)

*Primary Examiner* — Samson B Lemma
(74) *Attorney, Agent, or Firm* — John P. Davis; Thayne and Davis LLC

(57) ABSTRACT

The disclosure relates to systems and methods for managing state using relatively small assistance from protected hardware. Obfuscated code segments may communicate with supporting protected hardware, store encrypted state values in main memory, and/or communicate via secure channels to secure platform hardware components. In various embodiments, consistent state may be achieved, at least in part, by computing secure tag information and storing the secure tag information in a secure and/or otherwise protected device register. Consistent with embodiments disclosed herein, the tag information may be used to derive keys used to encrypt and/or decrypt stored state information. Tag information may further be used in connection with verification operations prior to using the information to derive associated keys.

17 Claims, 16 Drawing Sheets

Related U.S. Application Data

(60) Provisional application No. 62/879,908, filed on Jul. 29, 2019.

(58) Field of Classification Search
CPC .. G06F 21/64; G06F 21/74; G06F 2221/2107; H04L 2209/16; H04L 2209/38; H04L 9/3242; H04L 9/3263; H04L 9/0861
USPC .................................................. 713/190, 193
See application file for complete search history.

(56) References Cited

U.S. PATENT DOCUMENTS

| | | | |
|---|---|---|---|
| 7,559,091 | B2 | 7/2009 | Chu et al. |
| 7,984,511 | B2 | 7/2011 | Kocher et al. |
| 8,171,306 | B2 | 5/2012 | Venkatesan et al. |
| 8,176,473 | B2 | 5/2012 | Jacob et al. |
| 8,387,022 | B2 | 2/2013 | Horning et al. |
| 8,495,383 | B2* | 7/2013 | Ekberg ................ G06F 21/6272 713/176 |
| 8,762,736 | B1 | 6/2014 | Goldwasser et al. |
| 9,338,143 | B2 | 5/2016 | Hansen et al. |
| 9,390,264 | B2* | 7/2016 | Acar ....................... G06F 21/56 |
| 9,419,790 | B2 | 8/2016 | Kocher et al. |
| 9,647,834 | B2 | 5/2017 | Thanos et al. |
| 10,152,602 | B2* | 12/2018 | Kaplan ................... G06F 21/53 |
| 2008/0148062 | A1* | 6/2008 | Ekberg ................ H04W 12/069 713/187 |
| 2015/0302195 | A1* | 10/2015 | Acar ....................... G06F 21/52 726/23 |
| 2016/0132317 | A1 | 5/2016 | Mitchell et al. |
| 2016/0378522 | A1* | 12/2016 | Kaplan ............... G06F 12/1036 718/1 |
| 2017/0277898 | A1* | 9/2017 | Powell ................... G06F 21/53 |

OTHER PUBLICATIONS

Chow et al. White-Box Cryptopgrahy and an AES Implementation. SAC 2002, LNCS v. 2595, pp. 250-270. Springer., Published 2003. (18 pgs).

Narayanan et al. Obfuscating Straight Line Arithmetic Programs. DRM '09: Proceedings of the Nineth ACM Workshop on Digital Rights Management, Published Nov. 2009. (11 pgs).

Venkatesan et al. Obfuscating Straight Line Arithmetic Programs. Nineth ACM Workshop on Digital Rights Management., Published 2009. (28 pgs).

Goyal et al. Founding Cryptography on Tamper-proof Hardware Tokens. Cryptology ePrint Archive., Published 2010. (46 pgs).

Bitansky et al. Program Obfuscation with Leaky Hardware. In Advances in Cryptology (ASIACRYPT)., Published Dec. 6, 2011. (42 pgs).

Bos et al. Differential Computation Analysis: Hiding Your White-Box Designs is Not Enough. IACR Preprint 2015/753., Published 2015. (22 pgs).

Kainth et al. Hardware-Assisted Code Obfuscation for FPGA Soft Microproessors. Date 2015., Published 2015. (6 pgs).

Zhuang et al. Hardware Assisted Control Flow of Obfuscation for Embedded Processors. Cases 2004., Published 2004. (11 pgs).

Shen. Exploiting TrustZone on Android. Blackhat USA 2015., Published 2015. (31 pgs).

Laginimaineb. GSEE Privilege Escalation Vulnerability and Exploit. (CVE-2015-6639). Bits Please! Accessible at: http://bits-please.blogspot.com/2016/05/qsee-privilege-escalation-vulnerability.html., Published May 2016 (18 pgs).

Durnoga et al. One Time Programs with Limited Memory. ISC 2014., Published 2014. (18 pgs).

Goldwasser et al. One-Time Programs. Advances in Cryptology—Crypto 2008: Lecture Notes in Computer Science., Published Jan. 2008. (18 pgs).

Iliev. Hardware-Assisted Secure Computation. PhD. Thesis. Dartmoth College 2009., Published Aug. 2009. (254 pgs).

Sefanov et al. Path ORAM: An Extremely Simple Oblivious RAM Protocol. CCS 2013., Published 2013. (25 pgs).

Kostiainen et al. On-board Credentials with Open Provisioning. Conference: Proceedings of the 2009 ACM Symposium on Information, Computer and Communications Security, ASIACCS 2009, Sydney, Australia, Published Mar. 10-12, 2009. (19 pgs).

Website. On Board Credentials Project. https://se-sy.org/projects/obc. Accessed on or before Jul. 29, 2019. (1 pg).

Dmitrienko et al. Market-driven Code Provisioning to Mobile Secure Hardware. Financial Cryptography and Data Security: 19th International Conference, FC 2015, San Juan, Puerto Rico, Jan. 26-30, 2015, Revised Selected Papers (pp. 387-404), Published 2015. (18 pgs).

Vasudevan et al. Trustworthy Execution on Mobile Devices: What security properties can my mobile platform give me? Trust and Trustworthy Computing. Trust 2012. Lecture Notes in Computer Science, vol. 7344., Published 2011. (19 pgs).

"Parno et al. Memoir: Practical State Continuity for Protected Modules. IEEE Symp. Privacy andSecurity, 2011.", Published 2011. (16 pgs).

Sarmenta et al. Virtual Monotonic Counters and Count-Limited Objects Using a TPM Without a Trusted OS. STC '06: Proceedings of the First ACM Workshop on Scalable Trusted Computing., pp. 27-42., Published Nov. 2006. (15 pgs).

Strackx et al. Idea: State Continuous Transfer of State in Protected-Module Architectures. ESSoS 2015., Published 2015. (8 pgs).

Garg et al. Candidate Indistinguishability Obfuscation and Functional Encryption for All Circuits. FOCS 2013., Published 2013. (46 pgs).

Boyd et al. Protocols for Authentication and Key Establishment. Springer 2003., Published 2003. (343 pgs).

"Gong. Variations on the Themes of Message Freshness and Replay. Proc. Comp. Sec.Foundations Workshop VI, IEEE, 1993.", Published 2003. (25 pgs).

Krawczykk et al. HMAC: Keyed-Hashing for Message Authentication. IETF RF2104. Published Feb. 1997. (11 pgs).

Dworkin. Recommendation for Block Cipher Modes of Operation: The CMAC Mode for Authentication. NIST Special Publication 800-38B, Published May 2005. (21 pgs).

Dworkin. Recommendation for Block Ciper Modes of Operation: Galois/Counter Mode (GCM) and GMAC. NIST Specical Publication 800-38D, Published Nov. 2007. (39 pgs).

Chen. Recommendation for Key Derivation Using Pseudorandom Functions. NIST Special Publication 800-108. Oct. 2009. (21 pgs).

Lohrke et al. No Place to Hide: Contactless Probing of Secret Data on FPGA's. CHES. Published Jun. 2016. (21 pgs).

Barak et al. On the (Im)possibility of Obfuscating Programs. Published CRYPTO 2001. (18 pgs).

Costa et al. Intel SGX Explained. IACR ePrint 2016/086, Published 2016. (118 pgs).

Website. Wikipedia: Authenticated Encrption. https://en.wikipedia.org/wiki/Authenticated_encryption. Accessed on or before Jul. 29, 2019. (1 pg).

Nir et al. ChaCha20 and Poly1305 for IEFT Protocols. IETF RFC 3539. May 2015., Published May 2015. (45 pgs).

Roeder et al. Proactive Obfuscation. ACM Trans. Comput. System. 28, 2, Article 4., Published Jul. 2010. (54 pgs).

Varia. Studies in Program Obfuscation. Massachuttes Institute of Technology Department of Mathematics PhD Thesis Submission., Published Sep. 2010. (164 pgs).

Collberg et al. Watermarking, Tamper-Proofing, and Obfuscation—Tools for Software Protection. University of Arizona—Department of Computer Science Technical Report Mar. 2000., Published Feb. 10, 2000. (17 pgs).

Bock et al. On the Security Goals of White-Box Cryptography. Cryptology ePrint Archive: Report 2019/1014., Published Sep. 9, 2019. (38 pgs).

Bock et al. On the Security Goals of White-Box Cryptography. Cryptology ePrint Archive: Report 2020/104., Published Feb. 2, 2020. (38 pgs).

Bock et a. On the Security Goals of White-Box Cryptography. IACR Transactions on Cryptographic Hardware and Embedded Systems, 2020(2), 327-357., Published Feb. 3, 2020. (31 pgs).

(56) References Cited

OTHER PUBLICATIONS

International Search Report, dated Oct. 14, 2020, PCT/US2020/044095, (5 pgs).
Written Opinion, dated Oct. 14, 2020, PCT/US2020/044095, (11 pgs).
Gabriel Kaptchuk et al. "Giving State to the Stateless: Augmenting Trustworthy Computation with Ledgers". IACR, International Association for Cryptologic Research, vol. Apr. 16, 2018:190151., Published Apr. 16, 2018. (35 pgs).
Notice of Allowance dated Sep. 9, 2021 in U.S. Appl. No. 16/942,404 (15 pgs).
Communication from the EPO dated Mar. 9, 2022 in connection with EP Application No. 20757122.5-1218 (3 pgs).

* cited by examiner

700

```
Program
Non-volatile memory: x, c, j, h, w₁
begin
    d ← device.GetD()
    c ← 0
    j ← 0
    h ← device.GetH0()
    z, w₂ ← device.read()
    while true do
        w₁ ← w₂
        x ← external.input()
        device.commit(x, j, h)
        z, w₂ ← device.read()
        y, c, j, h ← f̃ⱼ(x, c, z, d, w₁, w₂)
        external.output(y)
    end
end
```

```
Protected Segment
Input: x, c, z, d, w₁, w₂
Output: y, c, j', h
Secret constants: k₁, k₂
Protected constants: j
begin
    if w₂ ≠ MAC(k₁; z, d, w₁, j, x) then fail
    kₛ = KDF(k₂; w₁)
    s ← Decrypt(kₛ; c)
    y, s, j' ← fⱼ(x, s, z, d)
    kₛ = KDF(k₂; w₂)
    c ← Encrypt(kₛ; s)
    h ← MAC(k₁; j', w₂)
    return y, c, j', h
end
```

```
Device Resource Get Function
Output: d
Protected constants: d
begin
    return d
end
```

706

```
Initial Tag Function
Output: h₀
Secret constants: k₁
begin
    return MAC(k₁; 0, 0)
end
```

708

```
Read Function
Output: z, w
Protected state: z, w
begin
    return z, w
end
```

```
Commit Function
Input: x, j, h
Secret constants: k₁
Protected constants: d
Protected state: z, w
begin
    if h ≠ MAC(k₁; j, w) then fail
    z ← newZ()
    w ← MAC(k₁; z, d, w, j, x)
end
```

900

```
Program
  Non-volatile memory: $x, u_1, c, j, h, w_1$
  begin
      $d \leftarrow$ device.GetD()
      $c \leftarrow 0$
      $j \leftarrow 0$
      $h \leftarrow$ device.GetH0()
      $z, w_2 \leftarrow$ device.read()
      while true do
          $w_1 \leftarrow w_2$
          $x, u_1 \leftarrow$ external.input()
          device.commit($x, u_1, j, h$)
          $z, w_2 \leftarrow$ device.read()
          $y, v_1, c, j, h \leftarrow \tilde{f}_j(x, u_1, c, z, d, w_1, w_2)$
          external.output($y, v_1$)
      end
  end
```

```
Protected Segment
  Input: $x, u_1, c, z, d, w_1, w_2$
  Output: $y, v_1, c, j', h$
  Secret constants: $k_1, k_2, k_3$
  Protected constants: $j$ begin
      if $w_2 \neq$ MAC($k_1; z, d, w_1, j, x, u_1$) then fail
      $w', x_1 \leftarrow$ Decrypt($k_3; u_1$)
      if $w' \neq w_1$ then fail
      $k_s =$ KDF($k_2; w_1$)
      $s \leftarrow$ Decrypt($k_s; c$)
      $y, y_1, s, j' \leftarrow f_j(x, x_1, s, z, d)$
      $v_1 \leftarrow$ Encrypt($k_3; w_2, y_1$)
      $k_s =$ KDF($k_2; w_2$)
      $c \leftarrow$ Encrypt($k_s; s$)
      $h \leftarrow$ MAC($k_1; j', w_2$)
      return $y, v_1, c, j', h$
  end
```

Figure 9B

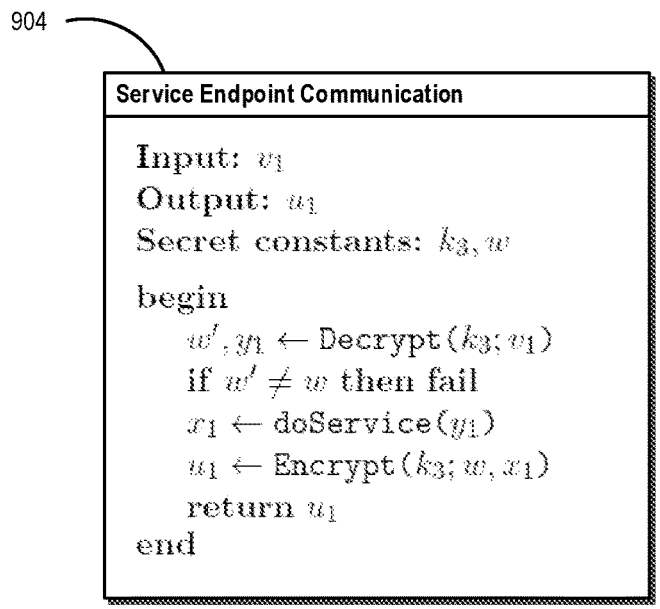
Figure 9C
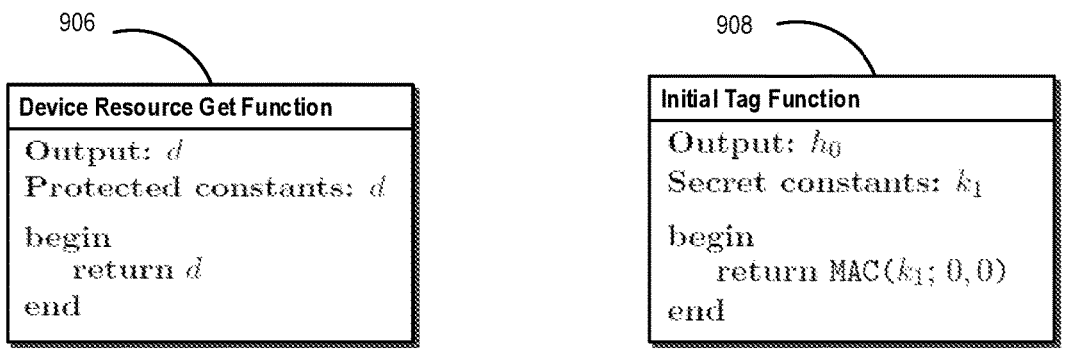
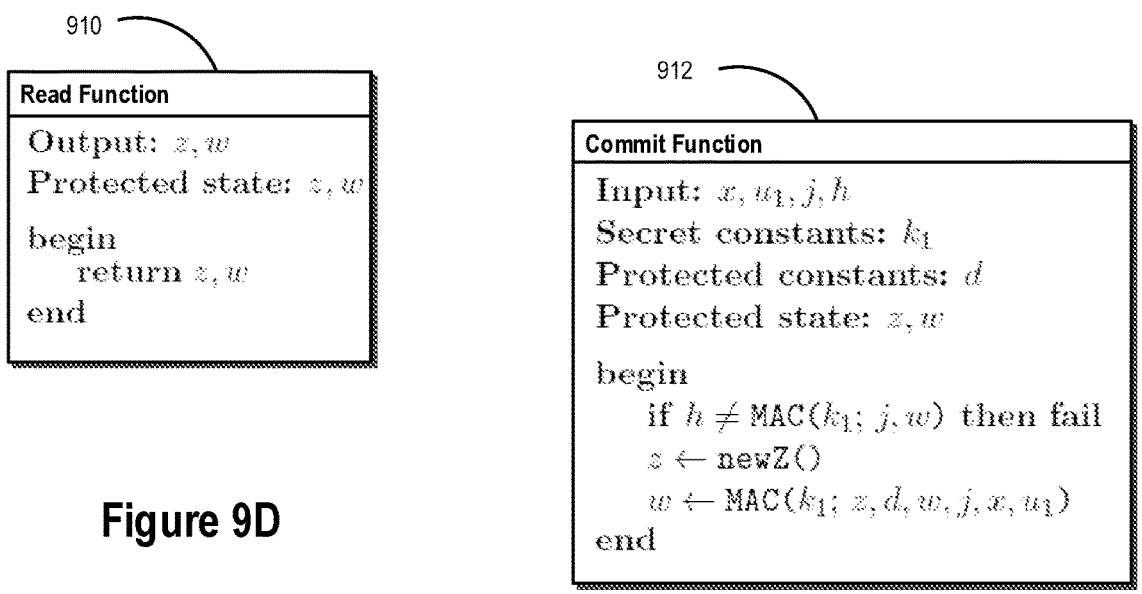
Figure 9D

1100

```
Program
Non-volatile memory: x, u₁, c, j, h, w₁
begin
    d ← device.GetD()
    c ← 0
    j ← 0
    h ← device.GetH0()
    z, w₂ ← device.read()
    while true do
        w₁ ← w₂
        x, u₁ ← external.input()
        device.commit(x, u₁, j, h)
        z, w₂ ← device.read()
        y, v₁, c, j, h ← f̃ⱼ(x, u₁, c, z, d, w₁, w₂)
        external.output(y, v₁)
    end
end
```

```
Protected Segment
Input: x, u₁, c, z, d, w₁, w₂
Output: y, v₁, c, j', h
Secret constants: k₁, k₂
Protected constants: j begin
    if w₂ ≠ MAC(k₁; z, d, w₁, j, x, u₁) then fail
    kₘ = KDF(k₁; w₁)
    x₁ ← Decrypt(kₘ; u₁)
    kₛ = KDF(k₂; w₁)
    s ← Decrypt(kₛ; c)
    y, y₁, s, j' ← fⱼ(x, x₁, s, z, d)
    kₘ = KDF(k₁; w₂)
    v₁ ← Encrypt(kₘ; y₁)
    kₛ = KDF(k₂; w₂)
    c ← Encrypt(kₛ; s)
    h ← MAC(k₁; j', w₂)
    return y, v₁, c, j', h
end
```

Figure 11B

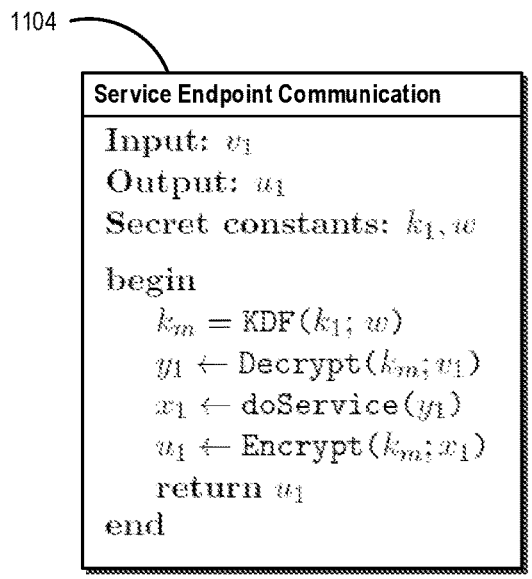
Figure 11C
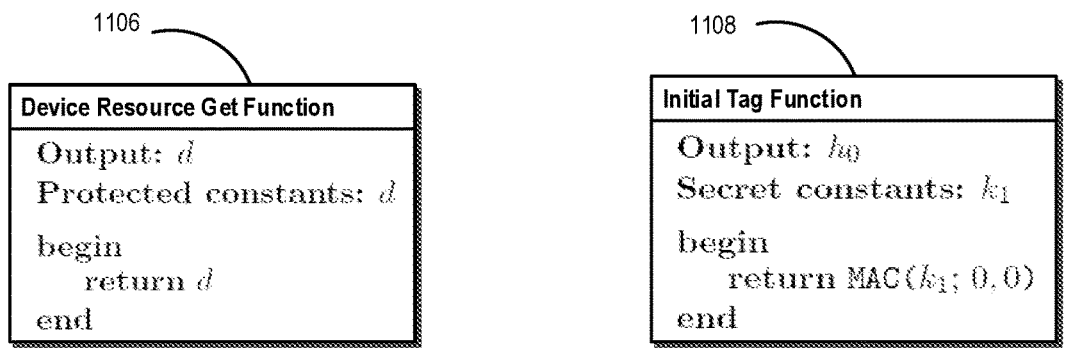
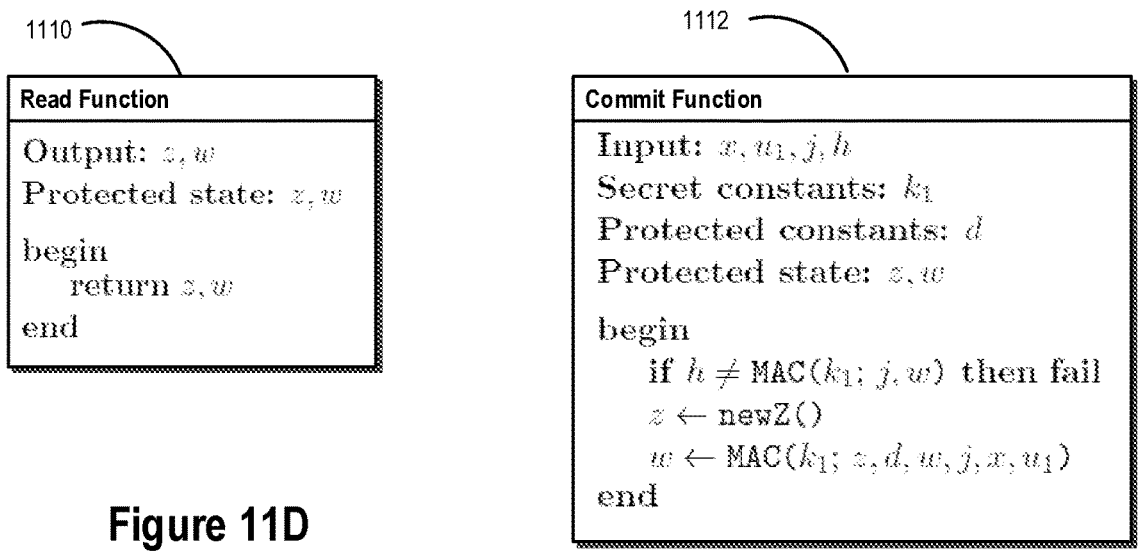
Figure 11D

SYSTEMS AND METHODS FOR MANAGING STATE

RELATED APPLICATION

This application is a continuation of U.S. patent application Ser. No. 16/942,404, filed Jul. 29, 2020, and entitled "SYSTEMS AND METHODS FOR MANAGING STATE," which claims the benefit of priority under 35 U.S.C. § 119(e) to U.S. Provisional Application No. 62/879,908, filed Jul. 29, 2019, and entitled "SYSTEMS AND METHODS FOR MANAGING STATE," both of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing state. More specifically, but not exclusively, the present disclosure relates to systems and methods for managing state using relatively small assistance from protected hardware.

Programs executing on devices may protect various internal program secrets such as, for example, cryptographic keys. A program may interact with external processes, and outputs of the program may have active consequences that the program is configured to control (e.g., content playback and/or financial payments).

In many circumstances, a device may not be dedicated and/or security hardened for a single purpose. For example, programs on a device may execute in a Rich Execution Environment ("REE"), which may host a variety of programs and/or applications. A device may also include one or more ports (e.g., network ports, removable media ports, and/or the like), which may enable the intrusion of malware, or the installation of software whose intent is to counter the security goals of some other program on the device.

Attacking malware may gain in-process and/or root access to a device's software, which may result in man-at-the-end ("MATE") threats involving adversaries with access to internal computational states of a device. Such adversaries may intend to compromise program secrets and/or circumvent program controls.

Certain devices may include secure hardware elements such as, for example and without limitation, Trusted Execution Environments ("TEEs") operating as facilities dedicated to execution of identified security sensitive programs. A TEE may isolate memory and/or device resources from MATE threats that reside in the REE. Some processor architectures (e.g., ARM TrustZone and/or Intel SGX) may provide hardware-enforced secure enclaves that isolate memory and/or CPU time slices, as well as some other device resources. Certain devices may further integrate other secure hardware elements, including separated and/or isolated (at least in part) processors, circuits, and/or associated memory.

If an adversary has physical access to a computing device, they may mount additional attacks. For example, side channel attacks may reveal internal program secrets through covert physical channels such as, for example, timing, noise on the power bus, and/or radiated electrical noise. Further physical attacks may use electrical probes, laser probes, acid baths, and/or x-ray scans to reveal internal computational state and/or signals associated with a device.

Some secure hardware elements included in a device may be hardened to mitigate against physical attacks. Such secure elements may comprise, for example and without limitation, mobile phone SIM chips, smart cards, and/or cryptographic hardware security modules ("HSMs"), secure elements for certain secure applications (e.g., biometric and/or other fingerprint applications, electronic payment applications, etc.).

Devices included in the Internet-of-Things ("IoT"), medical devices, and/or automotive-embedded devices may not have REEs capable of loading arbitrary applications. Devices in such applications may, in certain instances, be security hardened for a single purpose, may carefully verify signed software updates before loading them, inspect data inputs from users, sensors, and/or network ports, and/or the like to prevent buffer overflows and surreptitious code injection. In such circumstances, the risk of malware contamination may be relatively low. Such devices may nevertheless remain vulnerable to physical attacks and/or side channel attacks.

Systems and methods disclosed herein provide for the protection of a secure device application using software obfuscation with a relatively small secure hardware assist. In some embodiments, obfuscated code segments may communicate with the supporting secure hardware, store encrypted state values in main memory, and/or communicate via secure channels to secure platform hardware components. Simplified device provisioning may be achieved in some embodiments by pre-sharing secrets with the secure hardware that may be used to generate keys for encrypting and/or decrypting state information.

In various embodiments, consistent state may be achieved, at least in part, by computing secure tag information and storing the secure tag information in a secure and/or otherwise protected device register associated with secure hardware. Various disclosed embodiments are described in connection with a protected register. It will be appreciated that, as used herein, a protected register may comprise a variety of types of suitable protected memory, registers, and/or storage structures, and/or in relatively simple implementations may comprise a protected memory cell and/or location.

Consistent with embodiments disclosed herein, the tag information may be used to derive keys used to encrypt and/or decrypt state information stored in system memory. For example, in some embodiments, secure tag information may be used along with a key shared between secure hardware and an associated obfuscated software function to generate state information encryption and/or decryption keys.

Tag information may further be used in connection with verification operations prior to using the information to derive associated keys. In some embodiments, a sequence of tags may function as a counter used to facilitate state consistency. A given block of state information may be used with a pair of consecutive tags. In certain embodiments, the pair of tags may be used in connection with verification operations prior to using a current tag to derive a state information decryption and/or encryption key.

In certain embodiments, a method for managing program state information of a protected software function may comprise receiving, by a protected software function segment, one or more software function inputs and/or encrypted initial program initial program state information. The software function inputs may comprise, for example and without limitation, one or more of an external program input, a dynamic device resource input, and/or a static device resource input.

In some embodiments, the protected software function segment may comprise an obfuscated protected software function and/or a whitebox protected software function, although other software protection techniques are also envisioned. In various embodiments, the encrypted initial program state information may be retrieved from main system memory.

A previous secure tag and a current secure tag associated with the encrypted initial program state information may be retrieved from a protected memory register of secure hardware. The secure hardware may comprise, for example and without limitation, a secure enclave, a TEE, a secure hardware element, and/or secure circuitry implementing certain functions such as a message authentication code ("MAC") and/or a tag register. The previous secure tag and the current secure tag may, in some embodiments, comprise message authentication code tags, although other suitable type of hashing and/or other cryptographic operations may be used to generate the tags. In some embodiments, the previous secure tag and the current secure tag may comprise sequential tags included in the protected memory register. In further embodiments, the previous secure tag and the current secure tag may comprise sequential tags included in a hash chain and/or pseudorandom sequence maintained in the protected memory register.

A state decryption key may be generated using a key derivation function based on a protected fixed key and the previous secure tag. The state decryption key may be used to decrypt the encrypted initial program state information using the state decryption key. The protected software function may execute using, at least in part, the software function inputs and the decrypted initial program state information. Updated program state information may be generated in connection with the execution of the protected software function.

A state encryption key may be generated using a key derivation function based on the protected fixed key and the current secure tag. The updated program state information may be encrypted using the generated state encryption key and stored in main system memory.

In various embodiments, an updated current secure tag may be generated by calling the secure hardware. The updated current secure tag may be generated based, at least in part, on a shared key (e.g., an key shared by the secure hardware and the protected software function), the software function inputs, and the current secure tag. The updated current secure tag may be stored in the protected memory register of the secure hardware for future use. In some embodiments, the updated current secure tag may comprise a message authentication code tag. Generating the updated current secure tag may comprise cryptographically signing information including at least the protected software function inputs and the current secure tag using the shared key.

BRIEF DESCRIPTION OF THE DRAWINGS

The inventive body of work will be readily understood by referring to the following detailed description in conjunction with the accompanying drawings, in which:

FIG. 7A illustrates an example of the execution of a program implementing fault-tolerant protection techniques consistent with certain embodiments disclosed herein.

FIG. 7B illustrates an example of a protected code segment function using fault-tolerant protection techniques consistent with certain embodiments disclosed herein.

FIG. 7C illustrates examples of a static device resource get function, an initial tag function, a read function, and a commit function that may be used in connection with the execution of a program implementing fault-tolerant protection techniques consistent with certain embodiments described herein.

FIG. 9A illustrates an example of the execution of a program implementing platform services consistent with certain embodiments disclosed herein.

FIG. 9B illustrates an example of a protected code segment function implementing certain platform services consistent with certain embodiments disclosed herein.

FIG. 9C illustrates an example of a service endpoint communication in connection with certain platform services consistent with certain embodiments disclosed herein.

FIG. 9D illustrates examples of a static device resource get function an initial tag function, a read function, and a commit function that may be used in connection with the execution of a program implementing certain platform services consistent with certain embodiments described herein.

FIG. 11A illustrates another example of the execution of a program implementing platform services consistent with certain embodiments disclosed herein.

FIG. 11B illustrates another example of a protected code segment function implementing certain platform services consistent with certain embodiments disclosed herein.

FIG. 11C illustrates another example of a service endpoint communication in connection with certain platform services consistent with certain embodiments disclosed herein.

FIG. 11D illustrates further examples of a static device resource get function, an initial tag function, a read function, and a commit function that may be used in connection with the execution of a program implementing certain platform services consistent with certain embodiments described herein.

DETAILED DESCRIPTION

Figure 1:
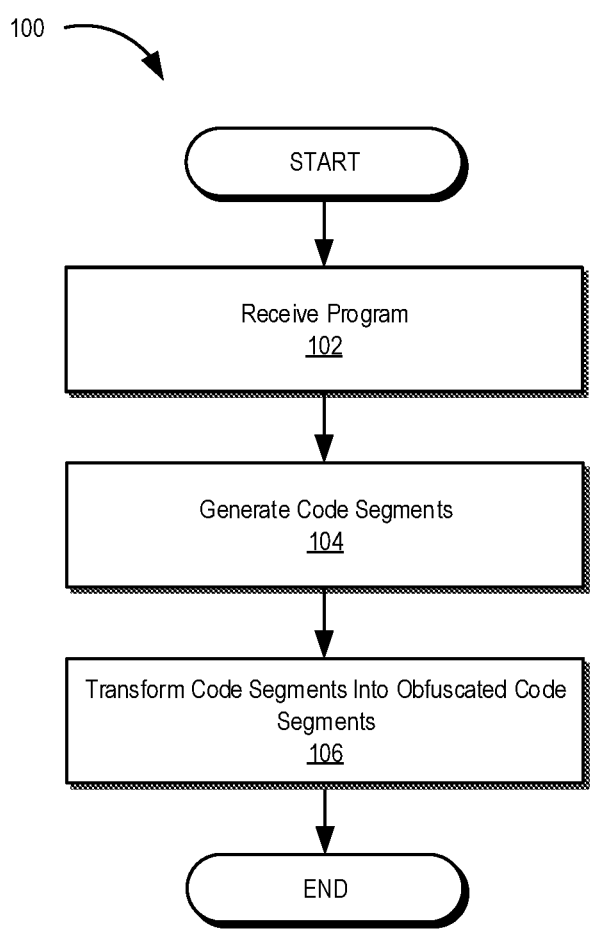
FIG. 1 illustrates a simplified example of a software protection method consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Certain embodiments of the systems and methods disclosed herein may provide for the protection of an application using software obfuscation with a relatively small hardware assist. Consistent with various embodiments, obfuscated code segments may communicate with the supporting hardware, store encrypted state values in main memory, and/or communicate via secure channels to secure platform hardware components.

Software Obfuscation

In general terms, a software program and/or an aspect thereof may be configured to perform a certain input-output function. If the function uses a key and/or internal secret, an adversary may be capable of extracting the key by examining the software program code. To mitigate this, the program may be obfuscated, resulting in code that is transformed and/or otherwise made more complex to resist reverse engineering. The resulting obfuscated program may compute the same (and/or substantially similar) function as the original program. For example, an obfuscated program may have the same input-output relation as an original unprotected program.

At least one security goal of software obfuscation consistent with various aspects disclosed herein may be Virtual Black Box ("VBB") security. VBB security may allow for obfuscated code to not reveal secret information regarding the program that would not otherwise be able to be obtained through black-box access to the program. That is, if VBB security is achieved, an adversary may learn no more from analyzing obfuscated code than what they would be able to learn from observing only the inputs and/or outputs of the software. Software obfuscation may, among other things, add security to implementations that are already protected with physical tamper resistance defenses, enable more straightforward distribution and updating of security solutions, and/or the like. Embodiments of the disclosed systems and methods may utilize a variety of software obfuscation techniques in connection with protecting software including, for example and without limitation, whitebox cryptographic obfuscation techniques and/or other techniques that may facilitate VBB security goals.

State Consistency

In some instances, software obfuscation may enable secure function evaluation. Consistent with various embodiments disclosed herein, security features associated with secure hardware may implement state consistency (e.g., persisting state information across system restarts and/or crashes). That is, if an obfuscated code segment writes a value to memory, the value may be securely read back within the associated execution thread. In some embodiments, this may mitigate the potential for an adversary to "roll back" memory to a previous state. Conventional software obfuscation techniques may not necessarily alone provide state consistency, as attackers may deliberately alter state between code segments and/or roll back to re-run code segments with different inputs.

Embodiments of the disclosed systems and methods may provide consistent state using a relatively small amount of isolated and/or otherwise secure hardware per execution thread. Obfuscated software running in an unprotected environment may encrypt its state and store the state ciphertext in unprotected and/or less-protected memory. A relatively small bank of non-volatile memory in isolated and/or otherwise secure hardware may be used to mitigate the replay of the encrypted state.

Consistent with various embodiments disclosed herein, the secure hardware may comprise, for example and without limitation, any suitable type of secure hardware enclave, secure hardware element, TEE, and/or protected, secure, and/or otherwise isolated memory, circuitry, and/or registers. In some embodiments, the secure hardware may comprise a secure hardware element comprising separate processor and memory that interfaces via specific I/O ports and/or through shared memory. In further embodiments, the secure hardware may comprise a secure enclave providing a TEE that uses the same central processing unit and/or memory as the REE, but may depend on a hardware memory manager and/or another method to maintain security.

Platform Services

In some embodiments, a secure hardware element and/or a platform itself may offer platform services such as a random number generator ("RNG") or a real-time clock ("RTC"). Various embodiments disclosed herein may provide a relatively straightforward way to offer these optional services to obfuscated code segments. Certain platforms may include private interfaces to isolated hardware components such as, for example and without limitation, secure user interfaces (e.g., keypad for user entries, 20-character secure displays, isolated touch screens, etc.), secure media displays (e.g., secure paths to analog audio output, high-bandwidth digital content protection ("HDCP") copy-protected video outputs, etc.), biometric sensors (e.g., fingerprint scanners, facial recognition camera and/or processor, voice recognition microphone and/or processor, etc.), Near Field Communication ("NFC") radios and/or other secure short range, location-sensing communication radios, and/or the like.

Embodiments disclosed here may use provisioned shared keys to operate a secure channel between obfuscated code segments and/or secure platform components. In further embodiments, secure channels may be operated using keys establishment based on trusted public keys. State consistency mechanisms consistent with the disclosed embodiments may, in some instances, provide a natural unpredictable tag and/or nonce value that is convenient for establishing message freshness in the secure channel.

Provisioning

In various disclosed embodiments, devices may be initially provisioned with certain constants. This provisioning may be performed at the factory and/or online under relatively secure conditions. For example, in certain embodiments, a device may be securely provisioned with a tag and/or nonce value w. In some embodiments, the initial tag and/or nonce could be initially provisioned as zero values. In various embodiments, the device may be "bricked" if, for example, a previous nonce value—which may be denoted as $w_1$—is lost. Various disclosed embodiments may allow for mechanisms to re-provision devices to working order (e.g., with a new shared key).

Hardware Implementation

In certain embodiments, secure hardware may be used that may implement a keyed hashing operation, such as a MAC operation, using a key shared with protected code segments, and may store a relatively small number of register values (e.g., tag and/or nonce values) for protected threads. In some embodiments, the sequence of register values, which in certain instances herein may be referred to as secure tags, tags, and/or MAC tags, may function as a pseudorandom counter used to facilitate state consistency. The MAC operation may comprise, for example, a HMAC-SHA1 operation, a CMAC-AES operation, and/or a Poly1305 operation. Some operations may involve a key derivation function ("KDF") that may, in certain instances, be implemented using a MAC algorithm. In certain embodiments, Encrypt and/or Decrypt operations may comprise authenticated encryption algorithms such as, for example, AES-GCM and/or ChaCha20/Poly1305.

In some embodiments, to improve robustness against glitches and/or asynchronous events, a commit function—which may commit associated information to memory and/or registers—may be performed atomically. In certain embodiments, ping-pong buffers may be used.

In various embodiments, hardware functions may be made available as special instructions within a central processing unit ("CPU") and/or as input-output instructions to special reserved addresses. Implementation circuitry may be on-chip, on-board, and/or plugged into a hardware bus and/or external peripheral bus such as a universal serial bus ("USB") port. In some embodiments, hardware functions may be implemented using custom circuitry, in a field programmable gate array ("FPGA"), and/or in a programmed microcontroller.

If isolated hardware is implemented using special tamper-resistant hardware techniques, such as auto-zeroing and/or x-ray shielding, the entire system may be hardened against physical attacks. Such implementations require relatively significant physical hardening, which may be costly. Embodiments disclosed herein may provide for relatively significant system security benefits by protecting a relatively small amount of physical hardware and using this protected hardware in conjunction with obfuscated software.

If the isolated hardware is implemented using limited hardware protection techniques, the system may not be hardened against extraordinary physical attacks, but may nevertheless still be hardened against malware and/or active attacks applied through attached network ports and/or removable media, and/or against attacks from malware within co-located software, such as, for example, side-loaded applications on a mobile device.

Device Binding

In certain embodiments, secure hardware may naturally provide device binding guarantees. That is, code running in the secure hardware may be configured to run on the device to which it has been provisioned. Various disclosed embodiments may allow for the isolated device and/or external entities to be in communication with hardware executing the protected program while the mechanism continues to function. Certain embodiments may allow these entities to be either in physical proximity and/or be linked by one or more intermediate network connections.

In certain embodiments, protected software may not be strictly bound to a device, but platform services can be device-bound. Protected software can be functionally bound to such device-bound platform services.

Program Preparation and Protection—DRM Engine Example

Various embodiments disclosed herein may provide for a mechanism that can be used wherever MATE threats exist against protected state. In some embodiments, an application may use a relatively small amount of state, so that the state block can be encrypted, decrypted, and/or manipulated as a single unit. Applications using a relatively large amount of addressable state can be built on top of embodiments of the disclosed mechanisms, but may also use further techniques to secure state (e.g., oblivious RAM ("ORAM"), encrypted database solutions, etc.).

In some implementations, a digital rights management ("DRM") engine residing on a desktop computer, a laptop computer, and/or a mobile device may enforce license models that restrict a number of times a title can be played on a device. For example, a simplified DRM engine may perform the following:

1. Receive a signed license containing an encrypted content key and a play count.
   (a) Verify the license signature.
   (b) Decrypt and store the content key.
   (c) Store the play count.
   (d) Go to step 2.

2. Receive a play request.
  (a) Retrieve the play count.
  (b) If expired and/or exhausted, return an error.
  (c) Decrement and store the play count.
  (d) Return the content key.
  (e) Repeat this step.

Various embodiments disclosed herein may split this program into two code segments. The program state may include a content key and/or a play counter. The repeat code segment may store these two items in an encrypted block (e.g., a single encrypted block). A state mechanism consistent with various of the disclosed embodiments may ensure that the repeat code segment that stores the encrypted state block with the initial play count may not necessarily be re-used many times.

Program Preparation and Protection—Mobile Payments Example

A simplified mobile payments application consistent with aspects of the disclosed embodiment may perform one or more of the following:

1. Receive a signed account voucher containing an encrypted authorization key and a monetary limit.
  (a) Verify the voucher signature.
  (b) Decrypt and store the authorization key.
  (c) Store the authorization limit.
  (d) Go to step 2.

2. Receive a payment request, containing an amount and an authorization challenge.
  (a) Retrieve the monetary limit and authorization key.
  (b) If limit is exhausted, go to Step 1.
  (c) Decrement and store the monetary limit.
  (d) Sign the authorization challenge.
  (e) Return the signed authorization challenge.
  (f) Repeat this step.

Various embodiments disclosed herein may split this program into two code segments. The program state may include an authorization key and/or a monetary limit. The first code segment may store these two items in an encrypted block (e.g., a single encrypted block). A state mechanism consistent with various embodiments may ensure that the first stored encrypted state block with the initial monetary limit may not be re-used many times.

Mechanism for Consistent State

Embodiments disclosed herein may be implemented in a program to be run on a device. The program may be single-threaded and/or long running, may accept a stream of external inputs, and/or produce a stream of external outputs. The inputs and/or outputs may be exchanged with a human user, network endpoints, other programs and/or threads, and/or any other data exchanging entity. The program may access program state data that may be stored on the device.

In various embodiments, consistent state may be provided in the presence of a MATE adversary using relatively simple and/or small secure and/or otherwise isolated hardware components. The adversary may be unable to cause the program to fulfill its function with altered and/or reused program state data, even if the adversary is able to stop the program and/or read, divert, and/or alter the program's inputs and/or outputs.

Program Preparation

FIG. 1 illustrates a simplified example of a software protection method 100 consistent with certain embodiments disclosed herein. In some embodiments, a program may be received at 102. In certain embodiments, the received program may be written in a form that includes one or more code segments that may be structured to incorporate various aspects of the disclosed software protection systems and methods. In further embodiments, a received program may be processed, modified, and/or otherwise adapted to a form more suitable to incorporate various aspects of the disclosed software protection systems and methods. For example, a program may not necessarily be written in a form that include segments and/or may be received in a form that may first need to be processed, at least in part, to generate functional segments for integration of security protection functionality consistent with aspects of the disclosed embodiments.

In various embodiments, a received program may be rewritten (or originally written) at 104 so that its external interactions are separated by code segments, which may comprise labeled code segments. The result may be a finite set of code segments whose functional signatures are of the form:

$$y, s', j' = f_j(x, s, z, d)$$

where:
j is the code segment identifier.
$f_j$ is the function computed by the code segment.
x are the external program inputs.
s is the code segment's input state data.
z are the dynamic device resources (e.g., time of day, random number, etc.).
d are the static device resources (e.g., device identifier, etc.).
y are the external program outputs.
s' is the code segment's output state data.
j' is the next code segment to run.

It will be appreciated that code segments may use different, some, and/or all of the inputs detailed above (e.g., external program inputs, input state data, dynamic device resources, static device resources) and/or may generate different, some, and/or all of the outputs detailed above (e.g., external program outputs, output state data, etc.). Accordingly, it will be appreciated that the various examples and methods described herein that may use the various inputs and/or outputs detailed above are provided for the purposes of illustration and explanation and not limitation. Further, although various embodiments and examples described herein may use the aforementioned inputs, outputs, and/or tag information in connection with generating various information (e.g., keys, secure tags, etc.), it will be appreciated that in further embodiments, hashes and/or other information derived from the aforementioned inputs, outputs, and/or tag information may be used in connection with certain aspects of the disclosed embodiment in lieu of the information itself to reduce computational complexity.

Figure 2A:
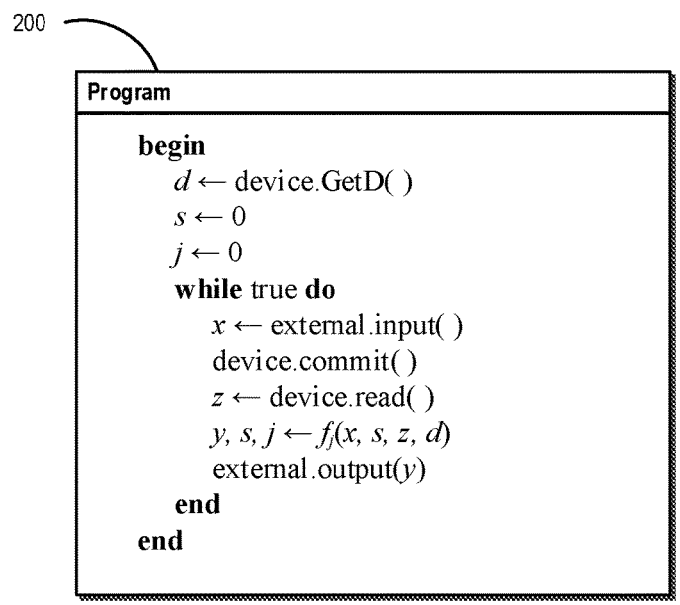
FIG. 2A illustrates an example of a program prior to implementing security protection consistent with certain embodiments disclosed herein.
Figure 2B:
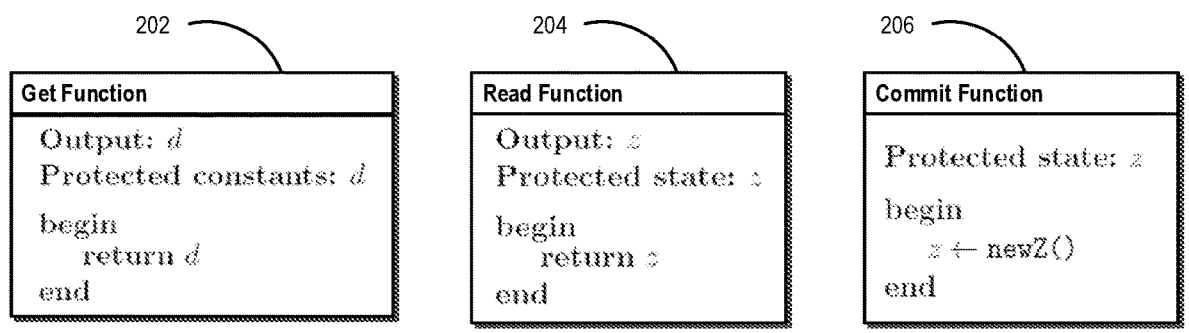
FIG. 2B illustrates examples of a get function, a read function, and a commit function prior to implementing security protection consistent with certain embodiments disclosed herein.

FIG. 2A illustrates an example of a program 200 prior to implementing security protection consistent with certain embodiments disclosed herein. FIG. 2B further illustrates examples of a get function 202, a read function 204, and a commit function 206 prior to implementing security protection consistent with certain embodiments disclosed herein. In various embodiments, the get function 202 may retrieve a static device resource such as, for example and without limitation, a device identifier, the read function may read information from a dynamic device resource such as, for example and without limitation, time/date/day information from a clock, an output from a random number generator, and/or the like, and the commit function 206 may hash segment input(s) and update the protected register.

Obfuscating the Program

Referring back to FIG. 1, at 106, the generated and/or written code segments may be transformed and/or otherwise obfuscated. For example, in various embodiments, code segments $f_j( )$ may be transformed into obfuscated code segments, $\tilde{f}_j(\ )$. Consistent with certain embodiments described herein, the transformed and/or otherwise obfuscated code segments may be configured to protect the code's internal secrets. The code's program data—which may be referred to in certain instances herein as its state and/or state information—may be stored in encrypted form in unprotected and/or less protected data memory. In some embodiments, the generated and/or written code segments may be protected and/or otherwise obfuscated using white box cryptographic obfuscation and/or other obfuscation techniques.

In various embodiments, consistent state may be achieved by computing a MAC tag, which may be referred to in certain instances herein as a secure tag and/or a tag, and storing the secure tag in a secure and/or otherwise protected device register w that may be protected and/or otherwise implemented by secure hardware. In certain embodiments, the secure tag associated with a particular state may be computed as part of a device commit function using a key shared by secure hardware and the protected code segments.

In certain embodiments, the MAC tag stored in the secure register w may be used to derive a key used to encrypt state information stored by the device. For example, the code's state may be encrypted using a state encryption key $k_s$ that may be derived from a tag included in a device's secure register w and a protected fixed key $k_2$. An encrypted state block c can be used within a code segment having access to the secure hardware and the associated device register w, but not by arbitrary adversary code.

In some embodiments, and as described in more detail below in connection with various examples, the MAC tag may be verified by code segments prior to use in connection with generating a state encryption key. In certain embodiments, because the code segments may verify the MAC tag, a state block may be used with a pair of $(w_1, w_2)$ of consecutive and/or otherwise sequential device-issued tags (e.g., a previous tag and a current tag). For example, a device's w register may change continuously in a hash chain that is effectively non-periodic. Therefore, a given state block c may be used with a single pair of tags $(w_1, w_2)$, because the device may issue one value of $w_2$ that follows the value of $w_1$ used to generate a key used decrypt the state block c. In this manner, a sequence of tags may function as a counter used to facilitate state consistency.

In various embodiments, the MAC tag $w_2$ may authenticate the code segment index j and the inputs to the code segment $f_j$. Accordingly, the state block c can be used with a single code segment $f_j$ and a single set of inputs x, z, and d. While the code segment $f_j$ can be re-computed multiple times (e.g., in the case of an asynchronous power disruption or system reset), the inputs and outputs y, c', and j' should be the same.

In certain embodiments, the mechanism may not force an adversary to follow code segment j with an intended code segment j'. In some implementations, the mechanism may not necessarily prevent an adversary from re-sending a given output y multiple times. This may be addressed, however, in a higher-level protocol in the design of the application embedded in the code segments and the external entity with which they communicate. For example, and without limitation, to prevent an adversary from successfully re-sending a given output multiple times, j' may be embedded in the state block, fault tolerant techniques may be employed described including those described in more detail below, and/or other suitable techniques may be used.

The mechanism may, in some implementations, depend, at least in part, on the protected code segments aborting if an adversary presents values that fail the MAC verification. Whichever mechanism is used to protect the code segments, it may resist potential attacks wherein the adversary adaptively tries multiple valid and failing inputs.

Figure 3A:
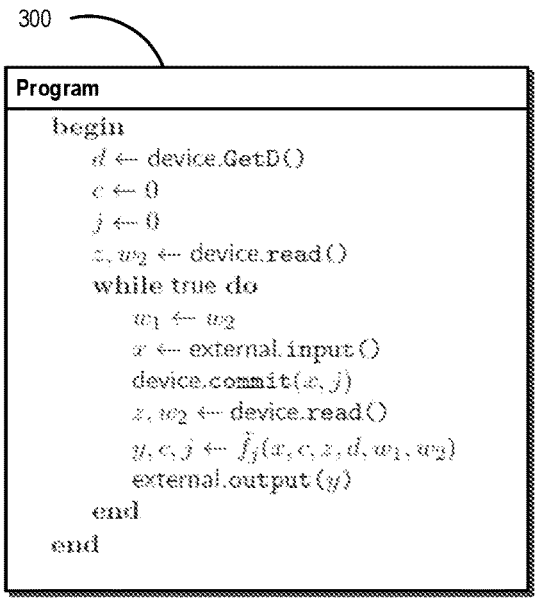
FIG. 3A illustrates an example of the execution of a program consistent with certain embodiments disclosed herein.
Figure 3B:
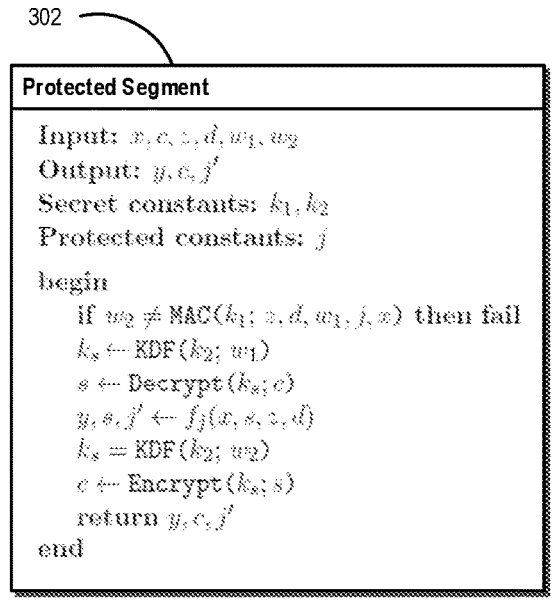
FIG. 3B illustrates an example of a protected code segment function consistent with embodiment disclosed herein.
Figure 3C:
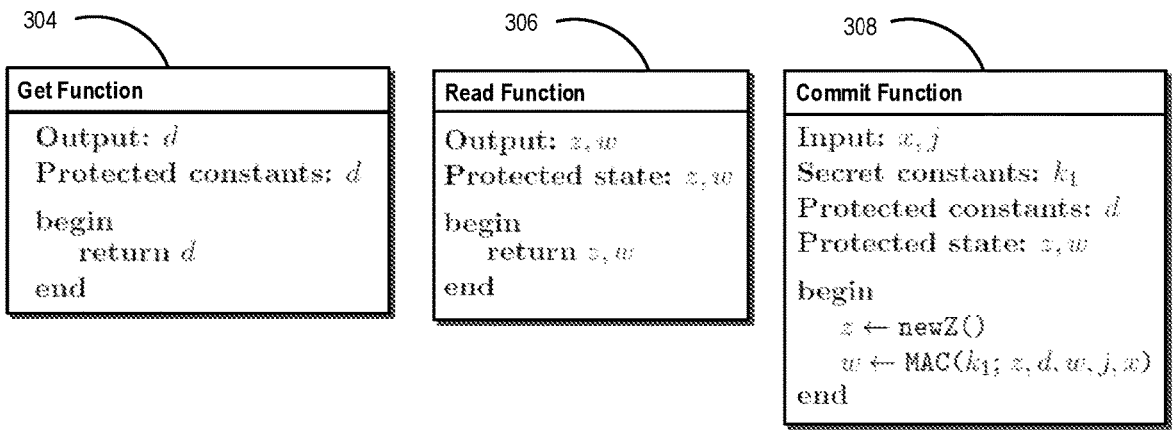
FIG. 3C illustrates examples of a get function, a read function, and a commit function that may be used in connection with the execution of a program consistent with embodiments described herein.

FIG. 3A shows an example of the execution of a program 300 consistent with certain embodiments disclosed herein. FIG. 3B shows an example of a protected code segment function $\widetilde{f_j}$ 302 consistent with embodiment disclosed herein. As used herein, the symbols "Encrypt" and "Decrypt" may represent authenticated encryption and decryption functions that may be used to encrypt and decrypt and/or authenticate data. In some embodiments, if the Decrypt function fails to verify the decrypted ciphertext, the containing algorithm may fail. FIG. 3C further illustrates examples of a get function 304, a read function 306, and a commit function 308 that may be used in connection with the execution of a program consistent with embodiments described herein.

In various embodiments, the program 300 may execute in relatively unprotected main memory and may facilitate relatively high-level device interactions including interactions with the device's secure hardware (e.g., calls to get function 304, the read function 306, and/or the commit function 308). The protected code segment 302 may comprise obfuscated and/or otherwise protected code functions (e.g., whitebox protected code). The get function 304, read function 306, and/or the commit function 308 may comprise protected functions executed by secure hardware. Consistent with various disclosed embodiments, to improve security, various calls to the get function 304, the read function 306, and/or the commit function 308 may be placed in the program 300 thread and not in the protected code segment 302. This may, in certain implementations, help to thwart program analysis and/or may provide a measure of defense against reverse engineering attacks.

In the examples illustrated in connection with FIGS. 3A-3C and certain other examples detailed herein and illustrated in the associated figures, protected constants may comprise constants that may be read externally from secure hardware but not written (e.g., j, d) and secret constants may not be read or written externally from secure hardware (e.g., $k_1$ and $k_2$). Similarly, protected state information (e.g., z, w) may comprise state information that may be read externally from secure hardware but not written.

Figure 4:
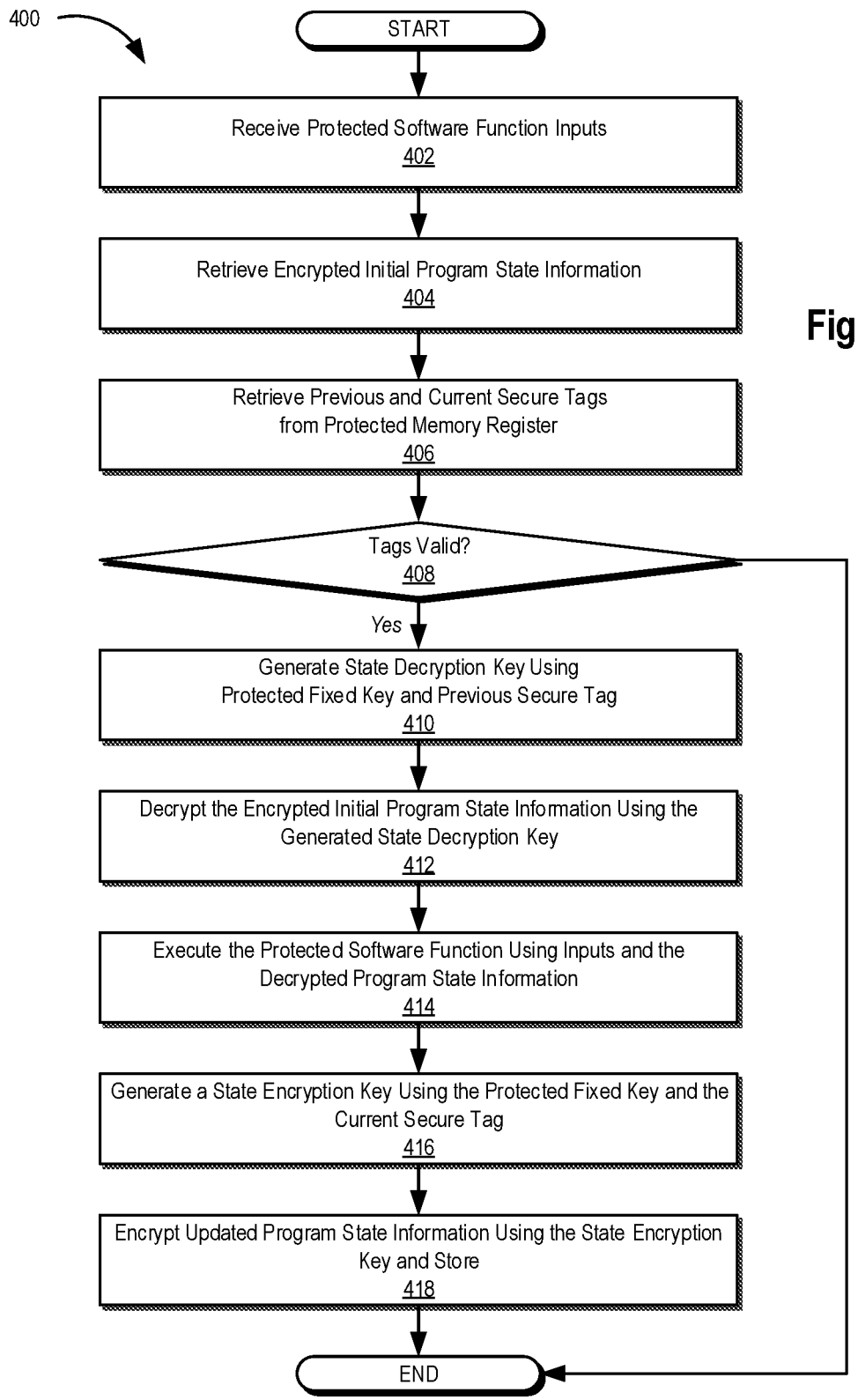
FIG. 4 illustrates an example of a method for the execution of a protected software function and associated state information management consistent with certain embodiments disclosed herein.

FIG. 4 illustrates an example of a method 400 for the execution of a protected software function and associated state information management consistent with certain embodiments disclosed herein. The illustrated method 400 may be implemented in a variety of ways, including using software, firmware, hardware, and/or any combination thereof. In certain embodiments, various aspects of the method 400 may be performed by, for example, a system that includes a protected and/or otherwise secure hardware and/or an associated protected memory register.

At 402, one or more inputs to the protected software function may be received. The one or more inputs may comprise, for example and without limitation, one or more of external program inputs, dynamic device resource inputs, static device resource inputs, and/or any other suitable inputs. Encrypted initial program state information may be further retrieved at 404.

At 406, a previous secure tag and a current secure tag associated with the encrypted initial program state information may be retrieved from a protected memory register. In various embodiments, the protected memory register may be associated with and/or otherwise included within secure hardware and may be stored in connection with associated protected, secure, and/or otherwise isolated memory. In various embodiments, the previous secure tag and/or the current secure tag may be generated using, at least in part, a hashing operation, such as a MAC operation.

In some embodiments, the method 400 may comprise a tag verification operation at 408 to verify the integrity and/or security of the previous secure tag and the current secure tag retrieved from the protected memory register. For example, in various embodiments, a suitable hashing operation such as a MAC operation may be performed based, at least in part, on the previous secure tag using a key shared between protected software code (e.g., the protected software function) and/or the secure hardware, and the result may be compared with the current secure tag to verify the integrity of the current secure tag and/or the previous secure tag (e.g. verifying that the inputs are associated with the current tag).

A state decryption key may be generated using a suitable key derivation function based, at least in part, on a protected fixed key and the previous secure tag at 410. Using the generated state decryption key the encrypted initial program state information may be decrypted at 412.

At 414, the resulting decrypted initial program state information may be used along with one or more of the received protected software function inputs to execute the protected software function. In various embodiments, executing the protected software function may result in the generation of updated program state information.

A state encryption key may be generated at 416 based on the protected fixed key and the current secure tag. At 418, the updated program state information may be encrypted using the generated state encryption key. The encrypted updated program state information may be stored in less secure memory.

In some embodiments, a program may call a commit function associated with secure hardware to update the tag information and generate an updated current secure tag. The updated current secure tag may be generated based, at least in part, on a shared key, the prior current secure tag, and/or one or more of the protected software function inputs and stored. Consistent with various disclosed embodiments, the updated current secure tag may be used in connection with future tag verification operations and/or future state encryption key generation. In some embodiments, the shared key may comprise a shared key between protected software code (e.g., the protected software function) and/or the secure hardware. The generated updated current secure tag may be stored in the protected memory register.

Fixed Key Variant

In various embodiments of the disclosed systems and methods, and as described above, state information s may be encrypted with a varying state encryption/decryption key $k_s$. In further embodiments, state consistency may be achieved while encrypting the state information s with a protected fixed key $k_2$.

Figures 5A, 5B:
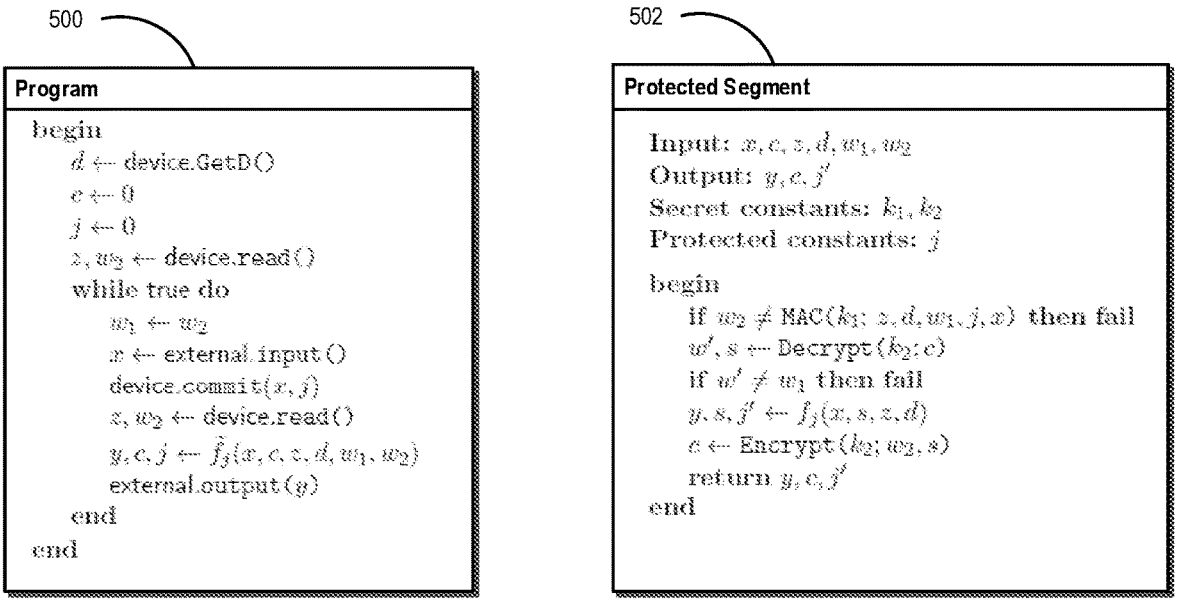
FIG. 5A illustrates an example of the execution of a program implementing fixed key obfuscation consistent with certain embodiments disclosed herein.
FIG. 5B illustrates an example of a protected code segment function using fixed key obfuscation consistent with certain embodiments disclosed herein.
Figure 5C:
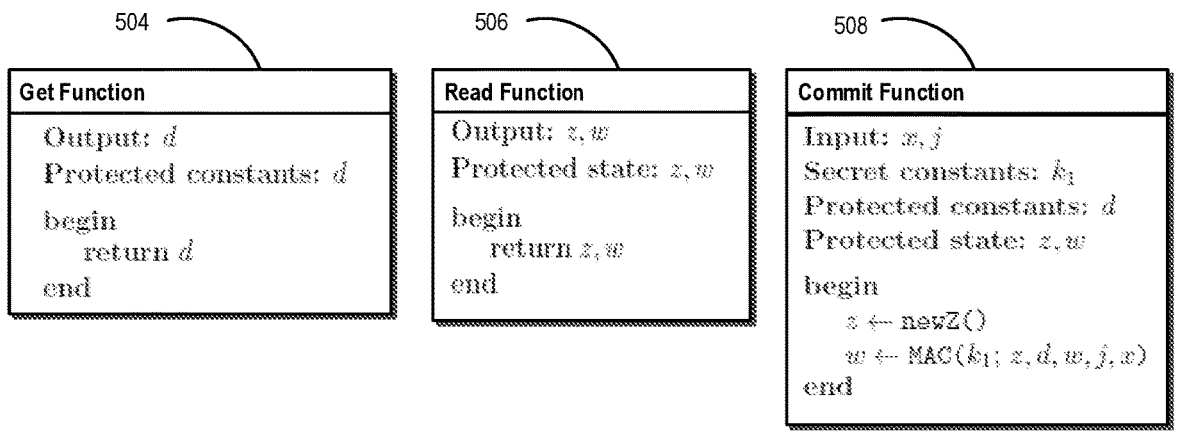
FIG. 5C illustrates examples of a get function, a read function, and a commit function that may be used in connection with the execution of a program implementing fixed key obfuscation consistent with embodiments described herein.

FIG. 5A an example of the execution of a program implementing fixed key obfuscation 500 consistent with certain embodiments disclosed herein. FIG. 5B shows an example of a protected code segment function using fixed key obfuscation 502 consistent with certain embodiments disclosed herein. FIG. 5C further illustrates examples of a get function 504, a read function 506, and a commit function 508 that may be used in connection with the execution of a program implementing fixed key obfuscation consistent with embodiments described herein.

In various embodiments, the program 500 may execute in main memory and may facilitate relatively high-level device interactions including interactions with the device's secure hardware (e.g., calls to get function 504, the read function 506, and/or the commit function 508). The protected code segment 502 may comprise obfuscated and/or otherwise protected code functions (e.g., whitebox protected code). The get function 504, read function 506, and/or the commit function 508 may comprise protected functions executed by secure hardware.

Figure 6:
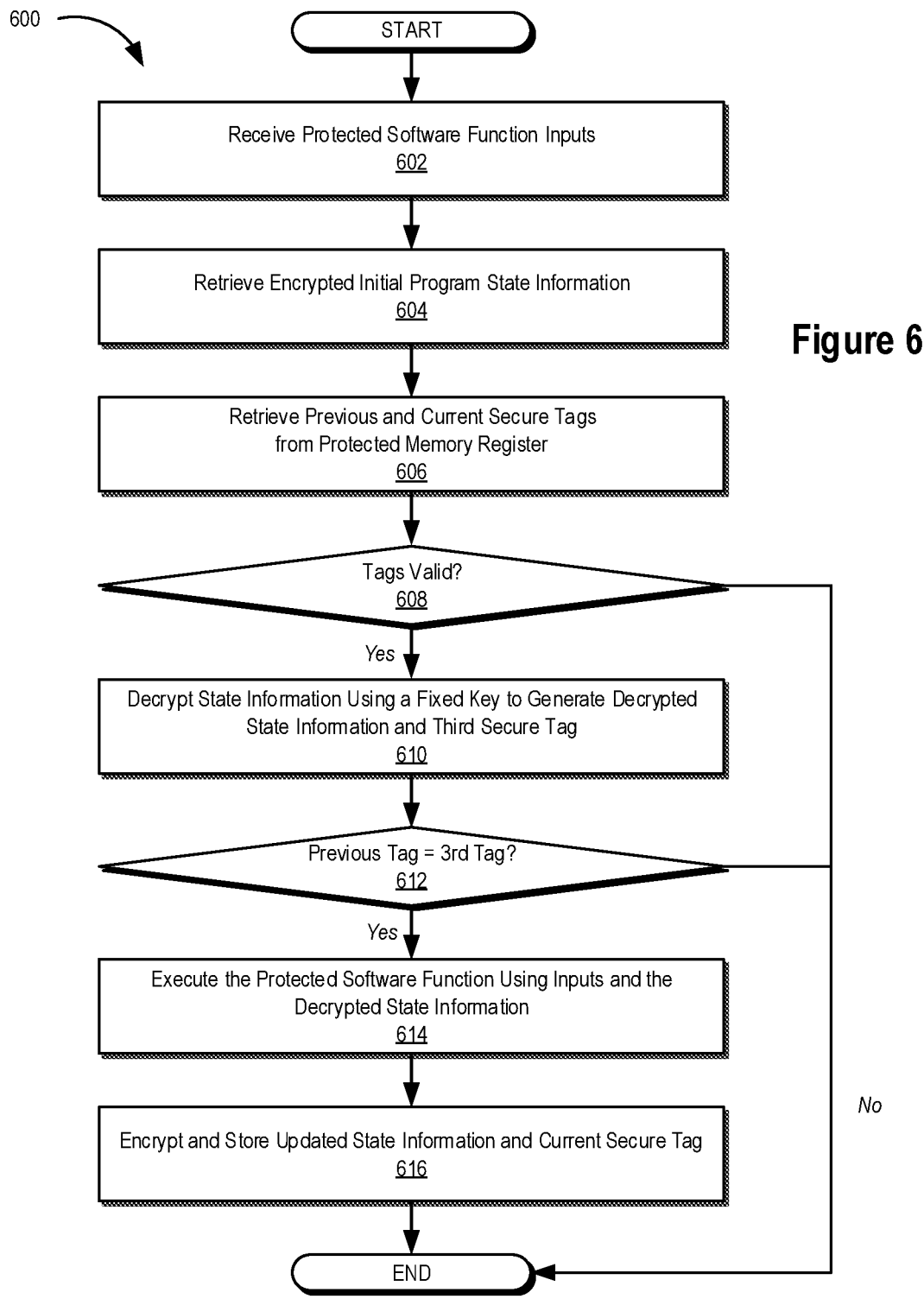
FIG. 6 illustrates an example of a method for the execution of a protected software function using fixed key obfuscation consistent with certain embodiments disclosed herein

FIG. 6 illustrates an example of a method 600 for the execution of a protected software function using fixed key obfuscation consistent with certain embodiments disclosed herein. The illustrated method 600 may be implemented in a variety of ways, including using software, firmware, hardware, and/or any combination thereof. In certain embodiments, various aspects of the method 600 may be performed by, for example, a system that includes a protected and/or otherwise secure hardware and/or an associated protected memory register.

At 602, one or more inputs to the protected software function may be received. The one or more inputs may comprise, for example and without limitation, one or more of external program inputs, dynamic device resource inputs, static device resource inputs, and/or any other suitable inputs. Encrypted initial program state information may be further retrieved at 604 (e.g., retrieved from main system memory).

At 606, a previous secure tag and a current secure tag associated with the encrypted initial program state information may be retrieved from a protected memory register. In various embodiments, the protected memory register may be associated with and/or otherwise included within secure hardware and may be stored in connection with associated protected, secure, and/or otherwise isolated memory. In various embodiments, the previous secure tag and/or the current secure tag may be generated using, at least in part, a hashing operation, such as a MAC operation.

The integrity and/or security of the previous secure tag and the current secure tag may be verified at 608. At 610, the encrypted state information may be decrypted using a fixed key consistent with aspects of the disclosed embodiments. In various embodiments, decrypting the encrypted state information may result in the generation and/or retrieval of decrypted state information and a third secure tag that in certain instances herein may be denoted as w'. The third secure tag may be compared with the previous secure tag at 612. If the third secure tag and the previous secure tag are the same, the method 600 may proceed to 614, where the protected software function may proceed to execute using the decrypted initial program state information along with one or more of the protected software function inputs. In various embodiments, executing the protected software function may result in the generation of updated program state information.

The updated state information and the current secure tag may be encrypted at 616 using the fixed key and stored. In some embodiments, an updated current secure tag may be generated based, at least in part, on a shared key, the prior current secure tag, and/or one or more of the protected software function inputs and stored. Consistent with various disclosed embodiments, the updated current secure tag may be used in connection with future tag verification operations. The generated updated secure tag may be stored in the protected memory register.

Improving Robustness and Fault Tolerance

In certain implementations, a thread may be prone to being accidentally disabled if a stray process calls a commit function haphazardly. In various embodiments, this may be mitigated by relatively small modifications to various of the disclosed software protection mechanisms. For example, a commit function may take a tag input h that is computed by first executing the proper code segment. This may prevent an adversary from executing code segments out of order. For example, a device may not perform a commit operation execute for the code segment index j that the program has previously computed. In some embodiments, fault tolerance may be achieved by, at least in part, restricting the device from performing a commit operation until after the protected code segment has completed and produced an output.

In various embodiments, this mechanism may be relatively robust and/or fault tolerant against accidental loss of power, system reset, and/or disruption. If some main-memory variables (e.g., x, c, j, h, and $w_1$) are kept in non-volatile memory, meaning that they may survive a disruption, then certain embodiments disclosed herein may allow for resumption after a disruption.

FIG. 7A illustrates an example of the execution of a program 700 implementing fault tolerant protection techniques consistent with certain embodiments disclosed herein. FIG. 7B shows an example of a protected code segment function 702 using fault tolerant protection techniques consistent with certain embodiments disclosed herein. In some embodiments, fault tolerant protection techniques may be realized by having separate device read and commit functions. In some embodiments, the commit function may be atomic—that is, the w value may not be corrupted to a value other than $w_1$ or $w_2$. FIG. 7C further illustrates examples of a static device resource get function 704, an initial tag function 706, a read function 708, and a commit function 710 that may be used in connection with the execution of a program implementing fault tolerant protection techniques consistent with certain embodiments described herein.

In various embodiments, the program 700 may execute in main memory and may facilitate relatively high-level device interactions including interactions with the device's secure hardware (e.g., calls to get functions 704, 706, the read function 708, and/or the commit function 710). The protected code segment 702 may comprise obfuscated and/or otherwise protected code functions (e.g., whitebox protected code). The static device resource get function 704, initial tag function 706, read function 708, and commit function 710 may comprise protected functions executed by secure hardware.

The program 700 shown in connection with FIG. 7A may expand a one-way protocol between secure hardware and protected software to a two-way protocol. In the illustrated program, a device may not update tag information stored in the secure register until it can confirm that the protected code segment function 702 has completed. That is, the thread may not commit to its next time increment until its previous output is safely stored in non-volatile memory. In the event a glitch interrupts the execution of the protected code segment function 702, the current secure tag value may be read from the protected register without concern that it has already been incremented and/or otherwise updated.

Figure 8:
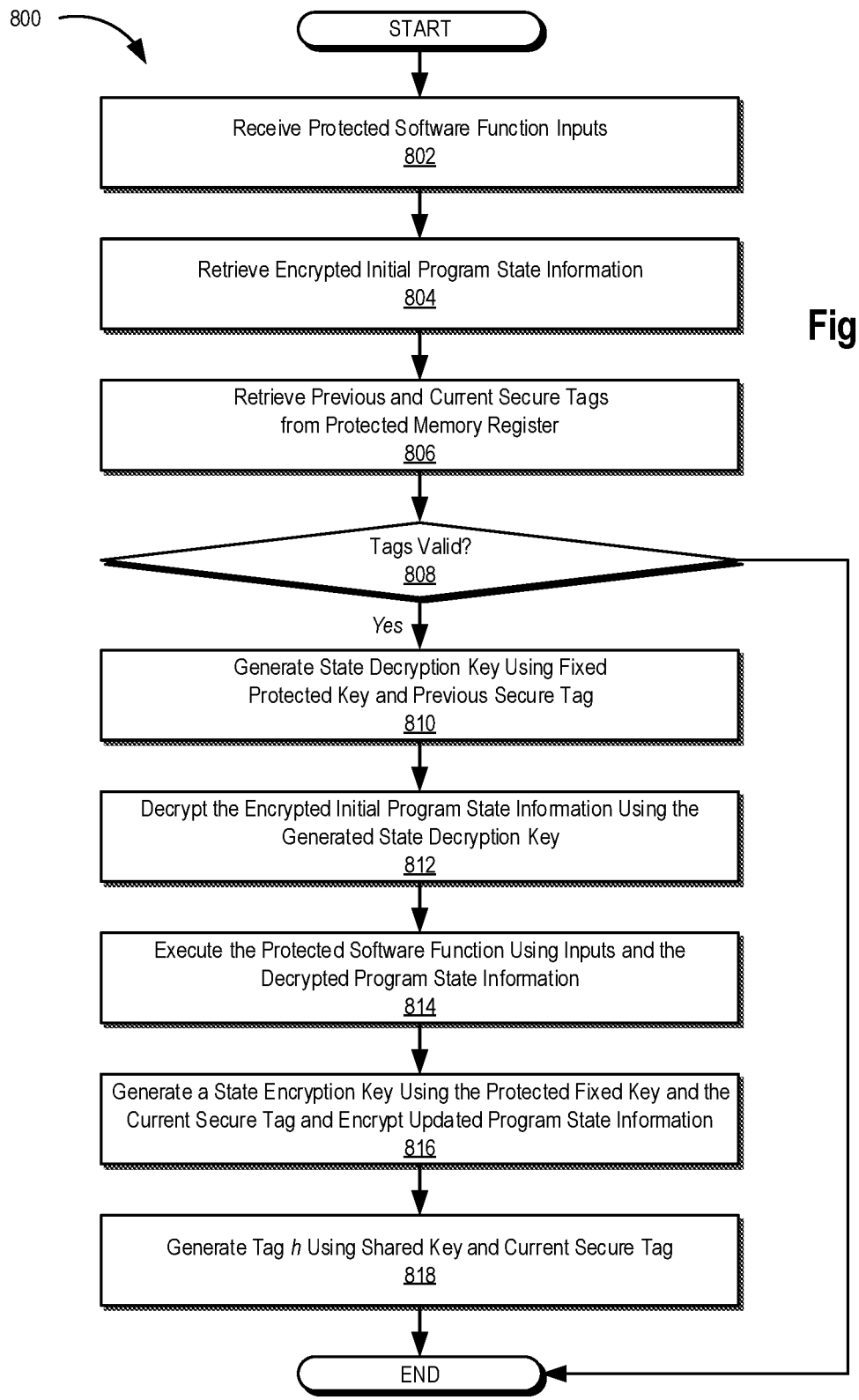
FIG. 8 illustrates an example of a method for the execution of a protected software function using fault-tolerant protection techniques and associated state information management consistent with certain embodiments disclosed herein.

FIG. 8 illustrates an example of a method 800 for the execution of a protected software function using fault tolerant protection techniques and associated state information management consistent with certain embodiments disclosed herein. The illustrated method 800 may be implemented in a variety of ways, including using software, firmware, hardware, and/or any combination thereof. In certain embodiments, various aspects of the method 800 may be performed by, for example, a system that includes a protected and/or otherwise secure hardware and/or an associated protected memory register.

At 802, one or more inputs to the protected software function may be received. The one or more inputs may comprise, for example and without limitation, one or more of external program inputs, dynamic device resource inputs, static device resource inputs, and/or any other suitable inputs. Encrypted initial program state information may be further retrieved at 804 (e.g., retrieved from main memory).

At 806, a previous secure tag and a current secure tag associated with the encrypted initial program state information may be retrieved from a protected memory register. In various embodiments, the protected memory register may be associated with and/or otherwise included within secure hardware and may be stored in connection with associated protected, secure, and/or otherwise isolated memory. In various embodiments, the previous secure tag and/or the current secure tag may be generated using, at least in part, a hashing operation, such as a MAC operation.

In some embodiments, the method 800 may further comprise a tag verification operation at 808 to verify the integrity and/or security of the previous secure tag and the current secure tag retrieved from the protected memory register. For example, in various embodiments, a suitable hashing operation such as a MAC operation may be performed based, at least in part, on the previous secure tag using a key shared between protected software code (e.g., the protected software function) and/or the secure hardware, and the result may be compared with the current secure tag to verify the integrity of the current secure tag and/or the previous secure tag.

A state decryption key may be generated using a suitable key derivation function based, at least in part, on a protected fixed key and the previous secure tag at 810. Using the generated state decryption key, the encrypted initial program state information may be decrypted at 812.

At 814, the resulting decrypted initial program state information may be used along with one or more of the received protected software function inputs to execute the protected software function. In various embodiments, executing the protected software function may result in the generation of updated program state information.

A state encryption key may be generated based on the protected fixed key and the current secure tag and the updated program state information may be encrypted using the generated state encryption key at 816. In some embodiments, the encrypted updated program state information may be stored in main system and/or otherwise less secure memory.

At 818, a tag h may be generated based on the shared key and the current secure tag. As discussed above, the shared key may comprise a shared key between protected software code (e.g., the protected software function) and/or the secure hardware. In some embodiments, the tag h may be computed by performing a MAC operation on information including the current secure tag using the shared key. The tag h may be used to prevent an adversary from executing code segments out of order. In some embodiments, it may also prevent the device from committing to an updated current tag until the output of the protected code segment is produced (e.g., in non-volatile memory).

Platform Services

In some circumstances, a code segment may exchange messages with one or more isolated device components that may implement certain platform services. The component and the code segment may share, for example, a symmetric key $k_3$, that in some embodiments may be derived from a shared key $k_1$ (e.g., a key shared between protected software code and/or function and/or secure hardware). In further embodiments, the secure channel between the device components and the code segment may be established using trusted public keys (e.g., PKI and/or pre-shared trusted keys). The messages between these endpoints may be protected by authenticated encryption.

In various embodiments, a platform service may implement a blocking request/response message interface. The blocking behavior may, at least in part, ensure that messages are synchronized with a secure tag w that may function as a nonce. In some embodiments, the service may emulate non-blocking behavior by responding with a "not ready" message and/or the like.

In various embodiments, the freshness of each message, which may be used in connection with replay mitigation, may be ensured and/or otherwise verified by using a non-repeating secure tag w that may function as a nonce, as described herein. In some embodiments, the platform service may have secure read access to a protected memory register storing secure tags. The secure tag and/or nonce may be be included in the message and/or used in deriving a message key $k_m$ and/or w.

FIG. 9A illustrates an example of the execution of a program 900 implementing platform services consistent with certain embodiments disclosed herein. FIG. 9B shows an example of a protected code segment function 902 implementing certain platform services consistent with certain embodiments disclosed herein. FIG. 9C shows an example of a service endpoint communication 904 in connection with certain platform services consistent with certain embodiments disclosed herein. FIG. 9D illustrates examples of a static device resource get function 906, an initial tag function 908, a read function 910, and a commit function 912 that may be used in connection with the execution of a program implementing certain platform services consistent with certain embodiments described herein. In the illustrated examples:

$x_1$ may represent program inputs from a secure system component.

$u_1$ may represent protected program inputs from a secure system component.

$y_1$ may represent program outputs to a secure system component.

$v_1$ may represented protected program outputs to a secure system component.

In various embodiments, the program 900 may execute in main memory and may facilitate relatively high-level device interactions including interactions with the device's secure hardware (e.g., calls to get functions 906, 908, the read function 910, and/or the commit function 912). The protected code segment 902 may comprise obfuscated and/or otherwise protected code functions (e.g., whitebox protected code). The static device resource get function 906, initial tag function 908, read function 910, and commit function 912 may comprise protected functions executed by secure hardware.

Figure 10:
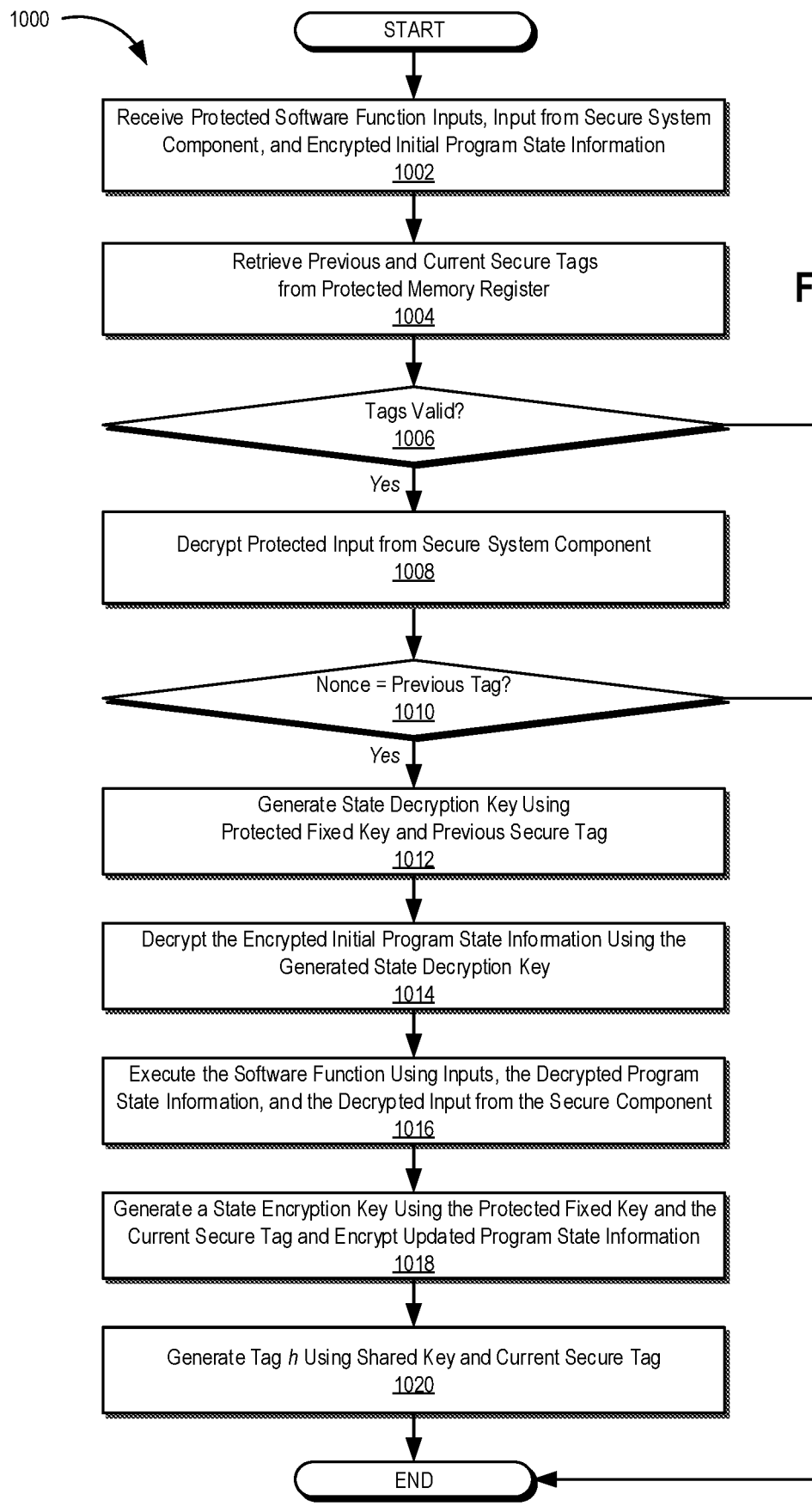
FIG. 10 illustrates an example of a method for the execution of a protected software function implementing certain platform services consistent with certain embodiments disclosed herein.

FIG. 10 illustrates an example of a method 1000 for the execution of a protected software function implementing certain platform services consistent with certain embodiments disclosed herein. The illustrated method 1000 may be implemented in a variety of ways, including using software, firmware, hardware, and/or any combination thereof. In certain embodiments, various aspects of the method 1000 may be performed by, for example, a system that includes a secure component and/or protected and/or otherwise secure hardware and/or an associated protected memory register.

At 1002, one or more inputs to the protected software function may be received. The one or more inputs may comprise, for example and without limitation, one or more of external program inputs, dynamic device resource inputs, static device resource inputs, a protected and/or otherwise encrypted program input received from a secure system component $u_1$, and/or any other suitable inputs. Encrypted initial program state information may be further retrieved at 1002.

At 1004, a previous secure tag and a current secure tag associated with the encrypted initial program state information may be retrieved from a protected memory register. In various embodiments, the protected memory register may be associated with and/or otherwise included within secure hardware and may be stored in connection with associated protected, secure, and/or otherwise isolated memory. In various embodiments, the previous secure tag and/or the current secure tag may be generated using, at least in part, a hashing operation, such as a MAC operation.

In some embodiments, the method 1000 may further comprise a tag verification operation at 1006 to verify the integrity and/or security of the previous secure tag and the current secure tag retrieved from the protected memory register. For example, in various embodiments, a suitable hashing operation such as a MAC operation may be performed based, at least in part, on the previous secure tag using a key shared between protected software code (e.g., the protected software function) and/or the secure hardware, and the result may be compared with the current secure tag to verify the integrity of the current secure tag and/or the previous secure tag.

At 1008, the protected program input received from the secure component $u_1$ may be decrypted using a symmetric key $k_3$. In some embodiments, the symmetric key may be derived from a key $k_1$ shared between protected software code and/or function and the secure hardware. In some embodiments, decrypting the protected program input may generate a decrypted program input from the secure component $x_1$ and an associated nonce value w'.

The nonce value w' may be compared with the previous secure tag at 1010 to determine if the nonce and the previous secure tag match. If so, the method 1000 may proceed to generate a state decryption key at 1012. In some embodiments, the state decryption key may be generated using a suitable key derivation function based, at least in part, on a protected fixed key and the previous secure tag. Using the generated state decryption key the encrypted initial program state information may be decrypted at 1014.

At 1016, the resulting decrypted initial program state information may be used along with one or more of the received protect software function inputs and/or the decrypted program input from the secure component $x_1$ to execute the protected software function. In various embodiments, executing the protected software function may result in the generation of updated program state information. The resulting output of the protected software function and/or the secure tag may be further encrypted using the symmetric key.

A state encryption key may be generated based on the protected fixed key and the current secure tag and the updated program state information may be encrypted using the generated state encryption key at 1018. In some embodiments, the encrypted updated program state information may be stored in less secure memory.

At 1020, a tag h may be generated based on the shared key and the current secure tag. As discussed above, the shared key may comprise a shared key between protected software code (e.g., the protected software function) and/or the secure hardware. In some embodiments, the tag h may be computed by performing a MAC operation on information including the current secure tag using the shared key. The tag h may be used to prevent an adversary from executing code segments out of order.

Platform Service Alternatives

In further embodiments implementing certain platform services, a secure tag may be used in deriving a message key $k_m$ along with a shared key $k_1$. FIG. 11A illustrates another example of the execution of a program 1100 implementing platform services consistent with certain embodiments disclosed herein. FIG. 11B shows another example of a protected code segment function 1102 implementing certain platform services consistent with certain embodiments disclosed herein. FIG. 11C shows another example of a service endpoint communication 1104 in connection with certain platform services consistent with certain embodiments disclosed herein. FIG. 11D illustrates further examples of a static device resource get function 1106, an initial tag function 1108, a read function 1110, and a commit function 1112 that may be used in connection with the execution of a program implementing certain platform services consistent with certain embodiments described herein.

In various embodiments, the program 1100 may execute in main memory and may facilitate relatively high-level device interactions including interactions with the device's secure hardware (e.g., calls to get functions 1106, 1108, the read function 1110, and/or the commit function 1112). The protected code segment 1102 may comprise obfuscated and/or otherwise protected code functions (e.g., whitebox protected code). The static device resource get function 1106, initial tag function 1108, read function 1110, and commit function 1112 may comprise protected functions executed by secure hardware.

Figure 12:
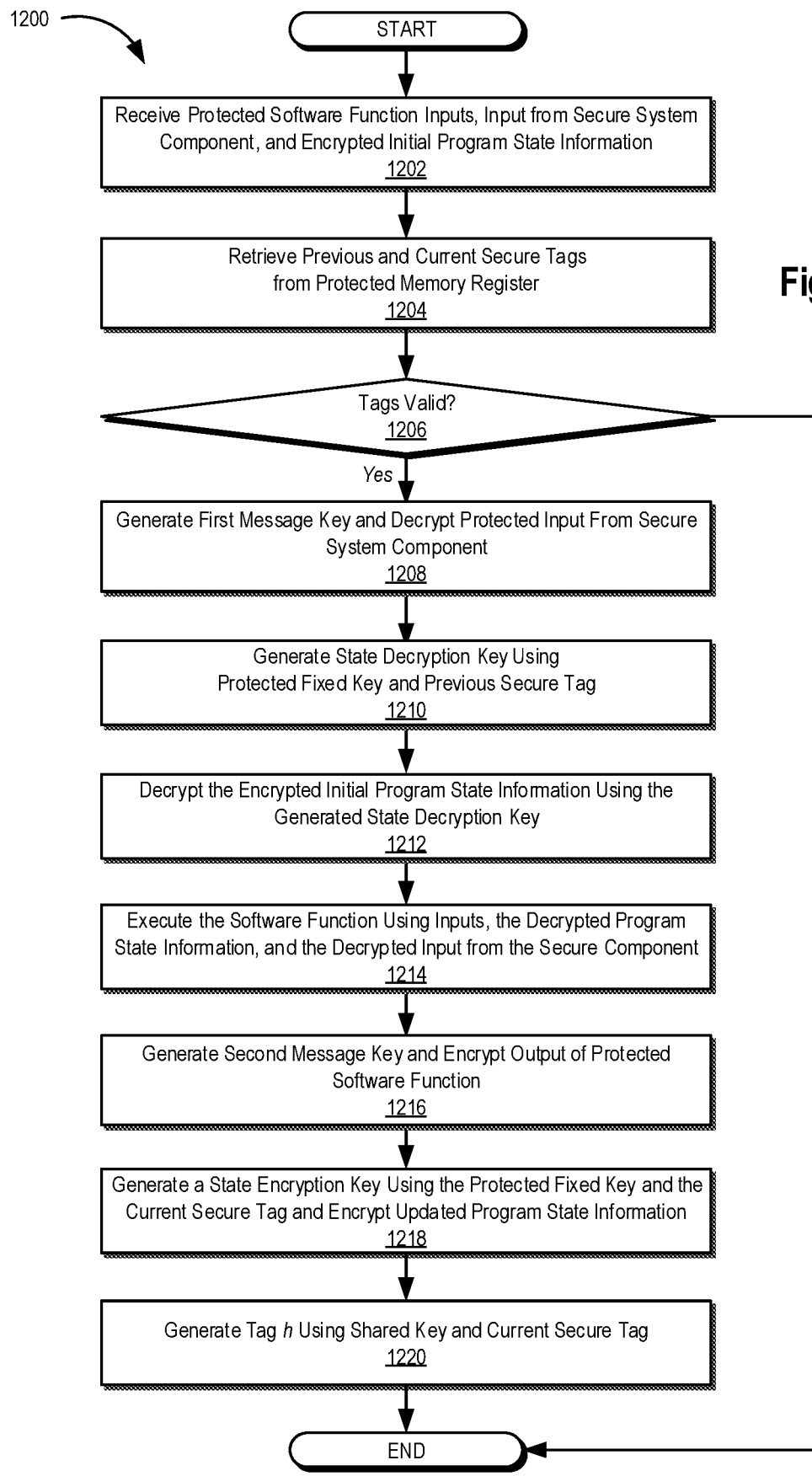
FIG. 12 illustrates another example of a method for the execution of a protected software function implementing certain platform services consistent with certain embodiments disclosed herein.

FIG. 12 illustrates another example of a method 1200 for the execution of a protected software function implementing certain platform services consistent with certain embodiments disclosed herein. The illustrated method 1200 may be implemented in a variety of ways, including using software, firmware, hardware, and/or any combination thereof. In certain embodiments, various aspects of the method 1200 may be performed by, for example, a system that includes a secure component and/or protected and/or otherwise secure hardware and/or an associated protected memory register.

At 1202, one or more inputs to the protected software function may be received. The one or more inputs may comprise, for example and without limitation, one or more of external program inputs, dynamic device resource inputs, static device resource inputs, a protected and/or otherwise encrypted program input received from a secure system component $u_1$, and/or any other suitable inputs. Encrypted initial program state information may be further retrieved at 1002.

At 1204, a previous secure tag and a current secure tag associated with the encrypted initial program state information may be retrieved from a protected memory register. In various embodiments, the protected memory register may be associated with and/or otherwise included within secure hardware and may be stored in connection with associated protected, secure, and/or otherwise isolated memory. In various embodiments, the previous secure tag and/or the current secure tag may be generated using, at least in part, a hashing operation, such as a MAC operation.

In some embodiments, the method 1200 may further comprise a tag verification operation at 1206 to verify the integrity and/or security of the previous secure tag and the current secure tag retrieved from the protected memory register. For example, in various embodiments, a suitable hashing operation such as a MAC operation may be performed based, at least in part, on the previous secure tag using a key shared between protected software code (e.g., the protected software function) and/or the secure hardware, and the result may be compared with the current secure tag to verify the integrity of the current secure tag and/or the previous secure tag.

At 1208, a first message key $k_m$ may be generated based on a key $k_1$ shared between protected software code and/or function and the secure hardware and the previous secure tag. The first key $k_m$ may be further used to decrypt the protected program input received from the secure component $u_1$ at 1208. In some embodiments, decrypting the protected program input may generate a decrypted program input from the secure component $x_1$.

The method 1000 may proceed to generate a state decryption key at 1210. In some embodiments, the state decryption key may be generated using a suitable key derivation function based, at least in part, on a protected fixed key $k_2$ and the previous secure tag. Using the generated state decryption key the encrypted initial program state information may be decrypted at 1212.

At 1214, the resulting decrypted initial program state information may be used along with one or more of the received protect software function inputs and/or the decrypted program input from the secure component $x_1$ to execute the protected software function. In various embodiments, executing the protected software function may result in the generation of updated program state information.

A second message key $k_m$ may be generated at 1216 based on the key $k_1$ shared between protected software code and/or function and/or secure hardware and the current secure tag. The generated second message key may be further used at 1216 to encrypt the resulting output of the protected software function.

A state encryption key may be generated based on the protected fixed key and the current secure tag and the updated program state information may be encrypted using the generated state encryption key at 1218. In some embodiments, the encrypted updated program state information may be stored in main and/or otherwise less secure memory.

At 1220, a tag h may be generated based on the shared key and the current secure tag. As discussed above, the shared key may comprise a shared key between protected software code (e.g., the protected software function) and/or the secure hardware. In some embodiments, the tag h may be computed by performing a MAC operation on information including the current secure tag using the shared key. The tag h may be used to prevent an adversary from executing code segments out of order.

Electronic Key Example

In at least one non-limiting example, embodiments of the disclosed software protection and associated state information management systems and methods may be implemented in connection with an electronic key system (e.g., an electronic car key system, an electronic door lock key system, etc.). In a conventional electronic key system, cryptographic secrets are held in a secure hardware element, and solder around the secure element chipset may physically bind the secrets to the physical device and an associated NFC transmitter. Embodiments of the disclosed systems and methods may provide for the protection of cryptographic and/or other secrets in connection with an electronic key system with smaller physically protected hardware than conventional systems.

In various embodiments, the NFC transmitter of an electronic key may be configured as a protected platform service that is coupled to protected software functions. Although certain examples are described herein as using NFC technology in connection with an electronic key, it will be appreciated that a variety of other types of suitable secure short range, location-sensing communication technologies could also be employed, including, for example and without limitation, Ultra-Wide Band 802.15 4z.

In certain implementations, an NFC transmitter may be configured as a protected platform service consistent with aspects of the disclosed embodiments. In such implementations, the key device may need to be in physical proximity to the keylock to activate the electronic keylock (e.g., a vehicle starter keylock and/or the like). This may, among other things, reduce the potential for unauthorized off-premise cloning of an electronic key.

Certain threats associated with malware might activate certain electronic key functions (e.g., vehicle functions) without providing appropriate user interfaces. Various embodiments disclosed herein may mitigate this attack by the inclusion of isolated user interface hardware on a mobile device and/or by using some other suitable multi-factor authentication technique.

Consistent with various aspects of the disclosed embodiments, an NFC transponder in an electronic key system may be relatively simple. In some embodiments, multiple applications executing on a mobile device may use aspects of the disclosed state information management and software protection techniques. As such, secure hardware used in connection with embodiments of the described systems and methods may be used by multiple applications including, for example and without limitation, older applications that may be updated with new features and/or updates.

In certain embodiments, keys shared between protected and/or otherwise obfuscated software functions and platform services may be provisioned and derived from a master key associated with a mobile device. In various embodiments, keys, which in some implementations may be paired with a certificate, may be revoked and/or blacklisted using suitable revocation mechanisms. In further embodiments, protected and/or otherwise obfuscated software functions and platform services may establish a symmetric key session and associated keys that may be used in connection with various aspects of the state information management and software protection techniques described herein.

Device Provisioning

In various embodiments, devices implementing embodiments of the disclosed state management methods may be provisioned with one or more of the following:

Devices may be initialized with a unique device ID d.

The obfuscated code segments may share a secret key $k_1$ with protected hardware.

A state and/or protected key $k_2$ and a communications symmetric key $k_3$ may be provisioned; otherwise, they may be derived from a shared key $k_1$.

An additional $k_b$ "bootstrap" key may be provisioned to assist with re-provisioning in the future.

If the hardware comprises a random number generator, it may have an initial random seed.

Under special circumstances it may be possible to reset a nonce and/or secure tag w and the real-time clock counter to zero.

An alternative to implementing the initial tag function in the above algorithms is to initially provision device main memory with a value of h0.

When the shared key $k_1$ is provisioned, new obfuscated code segments may be used as well, as the key may be programmed statically into the obfuscated software as a fixed key. If an operation resets the nonce w, it may also change out the shared key $k_1$ to prevent an adversary from playing old state blocks c.

Device Identity and Bootstrap Keys

In some embodiments, a manufactured device may initially have no identity, but may contain a pre-provisioned "bootstrap" key. The initial bootstrap key may or may not be unique to a device. If is not unique, it may be at least diversified. Device provisioning of the $k_1$ key may be performed over a secure channel, protected with the bootstrap key. In certain embodiments, provisioning the hardware may be accomplished through a physical port, such as a Joint Test Action Group ("JTAG") hardware diagnostic port, or through a port with a dedicated purpose (e.g., one-time programmable chips and/or fusible links). If physical attacks are not a threat, the ports may be unprotected, as long as the device is provisioned in a secure location. Otherwise, the provisioning itself may be performed over a secure channel, using a pre-provisioned "bootstrap" key.

Device Reset

In certain embodiments, a device's reset function may reset application configuration, usually to escape from difficult configuration errors. A device reset may not necessarily erase the device's identity and/or may not require re-provisioning thereafter. The device reset function may not necessarily alter any provisioned values (e.g., d, $k_1$, $k_2$, $k_3$, w, or the random number generator ("RNG") seed).

A device reset may not be exploitable as a replay attack. In some embodiments, the device reset function may inject an input signal x into the obfuscated code segments, and let them reset their state block c to a known state. The device reset function may not directly alter the "glitch recovery" backup data in nonvolatile main memory (e.g., x, $u_1$, c, j, h, $w_1$).

Anti-Replay Protocol Example

Figure 13:
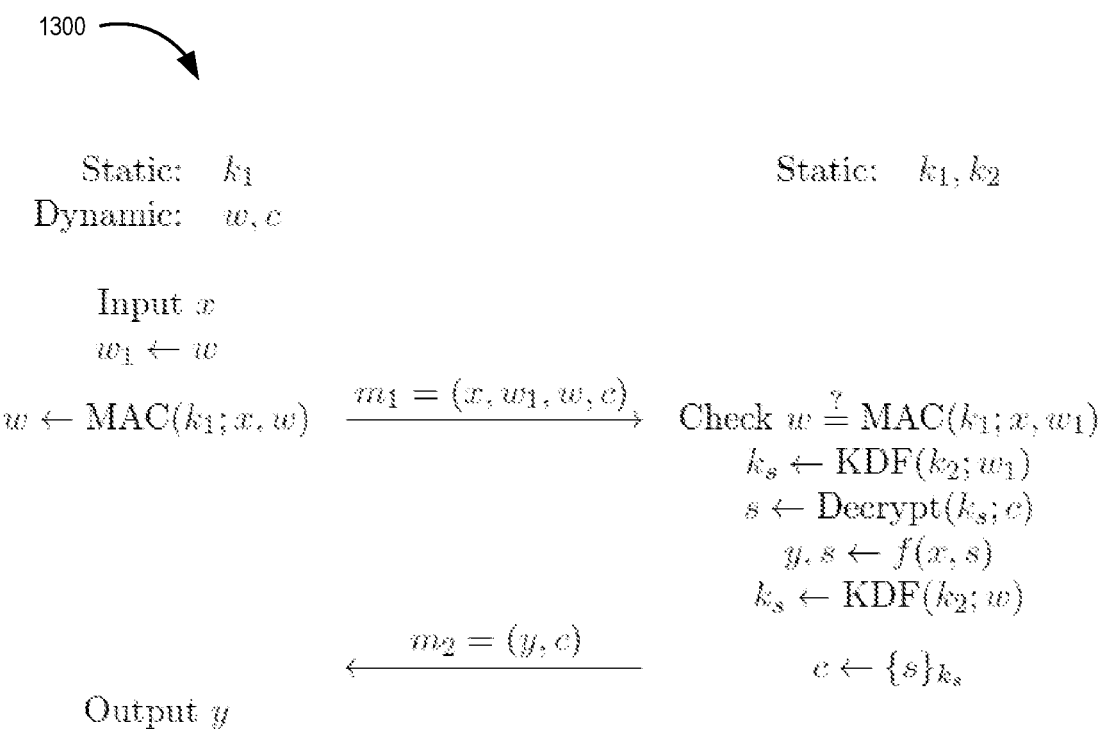
FIG. 13 illustrates an example of an anti-replay protocol consistent with certain embodiments disclosed herein.

FIG. 13 illustrates an example of an anti-replay (e.g., message freshness) protocol 1300 consistent with certain embodiments disclosed herein. In the illustrated protocol 1300, the curly brackets (e.g., ({•}k) depict encryption with a key k. In some embodiments, operations illustrated in connection with the right-hand side of the protocol 1300 may have no dynamic state. In some embodiments, pure function evaluation consistent with embodiments disclosed herein may be performed securely by an obfuscated code segment.

Figure 14:
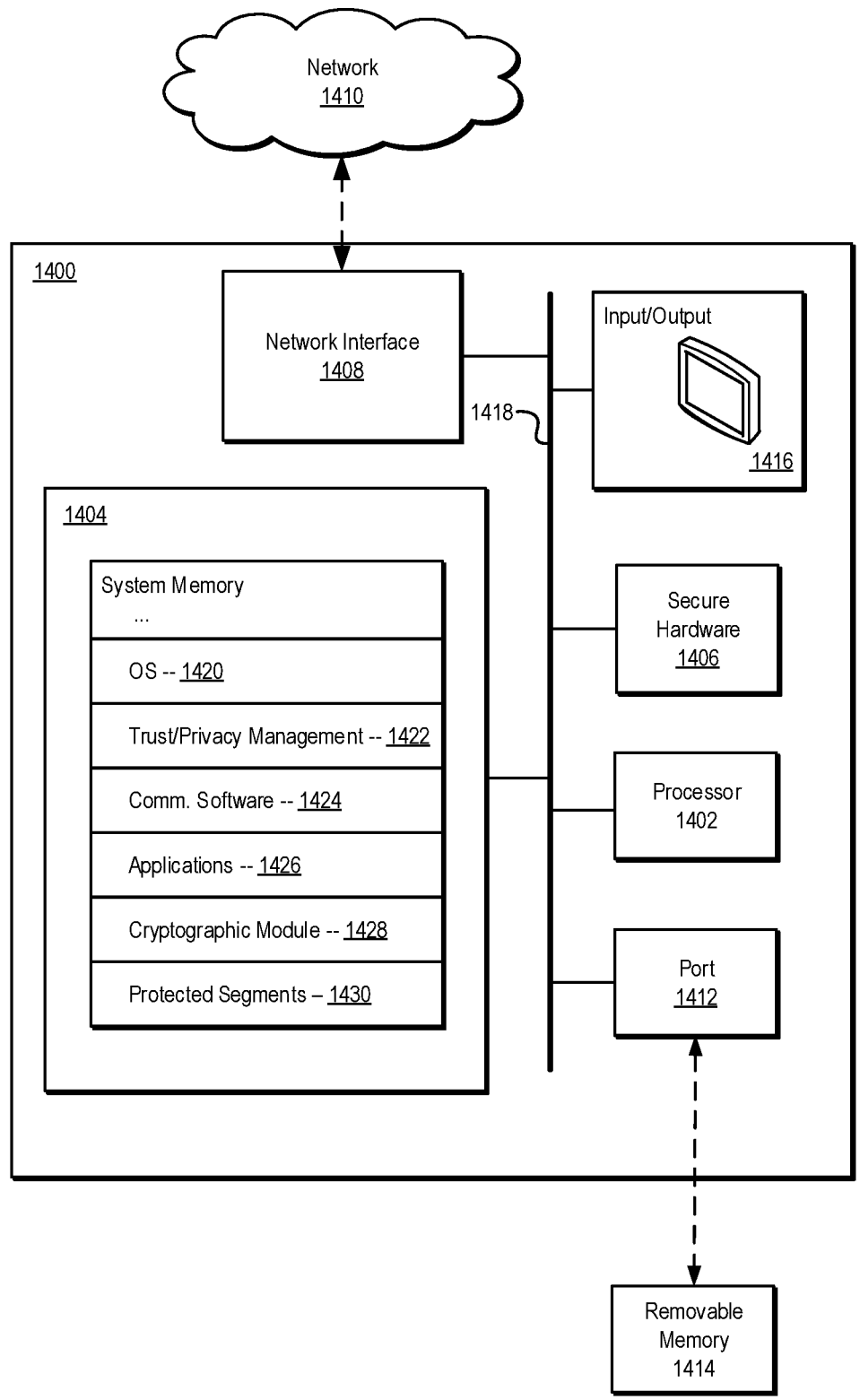
FIG. 14 illustrates an example of a system that may be used to implement certain embodiments of the systems and methods of the present disclosure.

FIG. 14 illustrates a system 1400 that may be used to implement certain embodiments of the systems and methods of the present disclosure. The system 1400 may comprise a variety of computing devices and/or systems, including any computing system suitable to implement the systems and methods disclosed herein. For example, the system 1400 may comprise a variety of types of computing devices and/or systems, including a laptop computer system, desktop computer system, server computer system, distributed computer system, smartphone, tablet computer, and/or the like.

In certain embodiments, the system 1400 may comprise at least one processor 1402 configured to execute instructions stored on an associated non-transitory computer-readable storage medium (e.g., system memory 1404). As discussed in more detail below, the system 1400 may further comprise secure hardware 1406 that, in some embodiments, may comprise secure processing unit ("SPU") configured to perform sensitive operations such as trusted credential and/ or key management, cryptographic operations, secure policy management, and/or other aspects of the systems and methods disclosed herein. The system 1400 may further comprise software and/or hardware (e.g., a network interface 1408) configured to enable electronic communication of information between the devices and/or systems via a network 1410 using any suitable communication technology and/or standard.

The system 1400 used in connection with the disclosed embodiments may be communicatively coupled using a variety of networks and/or network connections. In certain embodiments, the network 1410 may comprise a variety of network communication devices and/or channels and may utilize any suitable communications protocols and/or standards facilitating communication with the system 1400. The network 1410 may comprise the Internet, a local area network, a virtual private network, and/or any other communication network utilizing one or more electronic communication technologies and/or standards.

As illustrated in FIG. 14, the system 1400 may include: a processing unit 1402; system memory 1404, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 1402; a port 1412 for interfacing with removable memory 1414 that may include one or more diskettes, optical storage mediums (e.g., flash memory, thumb drives, USB dongles, compact discs, DVDs, etc.) and/or other non-transitory computer-readable storage mediums; a network interface 1408 for communicating with other systems via one or more network connections using one or more communication technologies; a user interface 1416 that may include a display and/or one or more input/output devices such as, for example, a touchscreen, a keyboard, a mouse, a track pad, and the like; and one or more busses 1418 for communicatively coupling the elements of the system.

In some embodiments, the system 1400 may, alternatively or in addition, include secure hardware 1416 that may be protected from tampering by a user of the system or other entities by utilizing secure physical and/or logical security techniques. In certain embodiments, the secure hardware 1416 may comprise an SPU and/or secure and/or otherwise isolated memory and/or storage registers. An SPU can help enhance the security of sensitive operations such as personal information management, key management, cryptographic and/or signing operations, and other aspects of the systems and methods disclosed herein. In certain embodiments, the SPU may operate in a logically secure processing domain and be configured to protect and operate on secret information, as described herein. In some embodiments, the secure hardware 1416 may include internal memory storing executable instructions or programs configured to enable the SPU to perform secure operations, as described herein.

In various embodiments, the secure hardware 1416 may comprise, for example and without limitation, a secure enclave, a TEE, a secure hardware element, secure circuitry implementing certain functions such as a MAC circuit, a Cipher-based MAC ("CMAC") circuit, an Advanced Encryption Standard ("AES") circuit, and/or a tag register, and/or the like.

The operation of the system 1400 may be generally controlled by the processing unit 1402 and/or an SPU included in the secure hardware 1416 operating by executing software instructions and programs stored in the system memory 1404 (and/or other computer-readable media, such as removable memory 1414). The system memory 1404 may store a variety of executable programs or modules for controlling the operation of the system. For example, the system memory 1414 may include an operating system ("OS") 1420 that may manage and coordinate, at least in part, system hardware resources and provide for common services for execution of various applications and a trust and privacy management system 1422 for implementing trust and privacy management functionality including protection and/or management of personal data through management and/or enforcement of associated policies. The system memory may further include, without limitation, communication software 1424 configured to enable in part communication with and by the system, applications 1426, a cryptographic module 1428 configured to perform various aspects of the disclosed embodiments (e.g., cryptographic key and hashing operations, etc.), programs, protected and/or otherwise obfuscated programs and/or program segments 1430, and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing program state information associated with a protected software function performed by a computing system comprising secure hardware, a processor, and a non-transitory computer-readable medium storing instructions that, when executed by the processor, cause the computing system to perform the method, the method comprising:
  receiving software function inputs;
  receiving encrypted initial program state information;
  retrieving a previous secure tag and a current secure tag associated with the encrypted initial program state information from a protected memory register of the secure hardware;
  decrypting the encrypted initial program state information using a fixed key to generate decrypted initial program state information and a third secure tag;
  determining that the previous secure tag and the third secure tag match;
  based on determining that the previous secure tag and the third secure tag match, executing the protected software function using, at least in part, the software function inputs and the decrypted initial program state information to generate updated program state information; and
  generating an updated current secure tag based, at least in part, on a shared key, the software function inputs, and the current secure tag.

2. The method of claim 1, wherein the method further comprises:
  encrypting the updated program state information using the fixed key; and
  storing the encrypted updated program state information in system memory maintained on the non-transitory computer-readable medium.

3. The method of claim 2, wherein encrypting the updated program state information using the fixed key is performed using an authenticated encryption function.

4. The method of claim 1, wherein the fixed key comprises a protected fixed key.

5. The method of claim 1, wherein the shared key comprises a key shared by the protected software function and the secure hardware.

6. The method of claim 1, wherein the method further comprises storing the updated current secure tag in the protected memory register.

7. The method of claim 1, wherein the updated current secure tag comprises a message authentication code tag and wherein generating the updated current secure tag comprises cryptographically signing information including at least the protected software function inputs and the current secure tag using the shared key.

8. The method of claim 1, wherein the software function inputs comprise at least one of an external program input, a dynamic device resource input, and a static device resource input.

9. The method of claim 1, wherein the previous secure tag and the current secure tag comprise message authentication code tags.

10. The method of claim 9, wherein the previous secure tag and the current secure tag comprise sequential tags included in the protected memory register.

11. The method of claim 9, wherein the previous secure tag and the current secure tag comprise sequential tags included in a hash chain maintained in the protected memory register.

12. The method of claim 1, wherein the encrypted initial program state information is retrieved from memory of the computing system.

13. The method of claim 1, wherein the protected software function comprises an obfuscated software function.

14. The method of claim 1, wherein the protected software function comprises a whitebox-protected software function.

15. The method of claim 1, wherein the method further comprises:
  generating a state encryption key using a key derivation function with the fixed key and the current secure tag as inputs to the key derivation function; and
  encrypting the updated program state information using the state encryption key.

16. The method of claim 1, wherein decrypting the encrypted initial program state information using the fixed key is performed using an authenticated decryption function.

17. The method of claim 1, wherein the method further comprises validating the integrity of the previous secure tag and the current secure tag.

* * * * *